US011826648B2

(12) United States Patent
Takahashi et al.

(10) Patent No.: US 11,826,648 B2
(45) Date of Patent: Nov. 28, 2023

(54) INFORMATION PROCESSING APPARATUS, INFORMATION PROCESSING METHOD, AND RECORDING MEDIUM ON WHICH A PROGRAM IS WRITTEN

(71) Applicant: SONY GROUP CORPORATION, Tokyo (JP)

(72) Inventors: Kei Takahashi, Tokyo (JP); Yasuyuki Koga, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/415,401

(22) PCT Filed: Jan. 17, 2020

(86) PCT No.: PCT/JP2020/001428
§ 371 (c)(1),
(2) Date: Jun. 17, 2021

(87) PCT Pub. No.: WO2020/158440
PCT Pub. Date: Aug. 6, 2020

(65) Prior Publication Data
US 2022/0040577 A1 Feb. 10, 2022

(30) Foreign Application Priority Data
Jan. 30, 2019 (JP) ................. 2019-014705

(51) Int. Cl.
A63F 13/54 (2014.01)
A63F 13/212 (2014.01)
A63F 13/428 (2014.01)

(52) U.S. Cl.
CPC ............ A63F 13/54 (2014.09); A63F 13/212 (2014.09); A63F 13/428 (2014.09)

(58) Field of Classification Search
CPC ........ A63F 13/54; A63F 13/428; G10K 15/04
See application file for complete search history.

(56) References Cited

U.S. PATENT DOCUMENTS

| | | | | |
|---|---|---|---|---|
| 1,654,892 A | * | 1/1928 | Meyer | ................... E05D 15/502 16/230 |
| 2007/0143127 A1 | * | 6/2007 | Dodd | ................. G06Q 30/0281 705/5 |

(Continued)

FOREIGN PATENT DOCUMENTS

| | | |
|---|---|---|
| JP | 2008-012102 A | 1/2008 |
| JP | 2010-239245 A | 10/2010 |

(Continued)

Primary Examiner — Seng H Lim
(74) Attorney, Agent, or Firm — Paratus Law Group, PLLC

(57) ABSTRACT

An information processing apparatus according to an embodiment of the present technology includes a reproduction control unit. The reproduction control unit controls, on the basis of time information regarding acquisition of sensor information generated on the basis of a motion of a real object, reproduction of audio content corresponding to the motion of the real object by a first reproduction method in a case where the time information is within a predetermined time range and controls the reproduction of the audio content by a second reproduction method in a case where the time information is out of the predetermined time range.

20 Claims, 14 Drawing Sheets

(56) References Cited

U.S. PATENT DOCUMENTS

| | | | |
|---|---|---|---|
| 2010/0022305 A1* | 1/2010 | Yano | A63F 13/00 |
| | | | 463/36 |
| 2010/0249961 A1* | 9/2010 | Yamane | G10L 19/012 |
| | | | 700/94 |
| 2011/0153118 A1* | 6/2011 | Lim | G06F 7/00 |
| | | | 701/2 |
| 2016/0269849 A1* | 9/2016 | Riggs | H04R 29/00 |
| 2017/0332186 A1* | 11/2017 | Riggs | H04S 7/301 |
| 2018/0264362 A1* | 9/2018 | Kitamura | A63F 13/42 |
| 2018/0352193 A1* | 12/2018 | Sakai | H04S 7/303 |
| 2018/0359553 A1* | 12/2018 | Mizuuchi | G10K 11/17823 |
| 2020/0312121 A1* | 10/2020 | Shiner | G08B 26/008 |
| 2021/0258709 A1* | 8/2021 | Jang | H03G 3/3005 |
| 2021/0366450 A1* | 11/2021 | Takahashi | G10H 1/0033 |

FOREIGN PATENT DOCUMENTS

| | | |
|---|---|---|
| JP | 2014-211808 A | 11/2014 |
| JP | 2018-109835 A | 7/2018 |
| WO | WO 2017/098772 A1 | 6/2017 |

* cited by examiner

A

B

A

B

A

B

A

B

| Scene examples | Sound examples |
|---|---|
| Associated with place or space | Bird song, river sound, raindrop sound |
| Change depending on motion of user | Footsteps sound |
| Change depending on motion of other user | Footsteps sound of other user |
| Change depending on motion of real object in real space | Sound of door, window, switch, remote controller |
| Change depending on virtual event in scenario | Sound depending on virtual ghost |

FIG.14

INFORMATION PROCESSING APPARATUS, INFORMATION PROCESSING METHOD, AND RECORDING MEDIUM ON WHICH A PROGRAM IS WRITTEN

CROSS REFERENCE TO PRIOR APPLICATION

This application is a National Stage patent application of PCT International Patent Application No. PCT/JP2020/001428 (filed on Jan. 17, 2020) under 35 U.S.C. § 371, which claims priority to Japanese Patent Application No. 2019-014705 (filed on Jan. 30, 2019), which are all hereby incorporated by reference in their entirety.

TECHNICAL FIELD

The present technology relates to an information processing apparatus, an information processing method, and a recording medium on which a program is written, which can be applied to audio control of audio augmented reality (AR) and the like.

BACKGROUND ART

In an audio output method described in Patent Literature 1, a movement time for an object operated by a player to reach a second approach area from a first approach area is calculated on the basis of an image captured by a camera. The calculated movement time is referenced and the audio output timing is adjusted such that the player hears the sound substantially at the same time that the object reaches the second approach area. Accordingly, it is attempted to inform the player that an action has been recognized through both the sense of vision and the sense of hearing (paragraphs [0052] and [0055] in specification, FIGS. 8 and 9, and the like of Patent Literature 1).

CITATION LIST

Patent Literature

Patent Literature 1: Japanese Patent Application Laid-open No. 2008-12102

DISCLOSURE OF INVENTION

Technical Problem

For such audio control of the audio AR and the like, it is desirable to provide a technology that enables a high-quality virtual experience to be provided.

In view of the above-mentioned circumstances, it is an object of the present technology to provide an information processing apparatus, an information processing method, and a recording medium on which a program is written, which enable a high-quality virtual experience to be provided.

Solution to Problem

In order to accomplish the above-mentioned object, an information processing apparatus according to an embodiment of the present technology includes a reproduction control unit.

The reproduction control unit controls, on the basis of time information regarding acquisition of sensor information generated on the basis of a motion of a real object, reproduction of audio content corresponding to the motion of the real object by a first reproduction method in a case where the time information is within a predetermined time range and controls the reproduction of the audio content by a second reproduction method in a case where the time information is out of the predetermined time range.

In this information processing apparatus, the reproduction of the audio content corresponding to the motion of the real object is controlled on the basis of the time information regarding the acquisition of the sensor information generated on the basis of the motion of the real object. Specifically, the reproduction of the audio content is controlled by the first reproduction method in a case where the time information is within the predetermined time range. The reproduction of the audio content is controlled by the second reproduction method in a case where the time information is out of the predetermined time range. Accordingly, a high-quality virtual experience can be provided.

The time information may be generated on the basis of the motion of the real object and sent to the information processing apparatus by a sensor device.

The time information may be an arrival time from a time at which the sensor information is generated or a time at which the sensor information is sent to the information processing apparatus to a time at which the sensor information is acquired.

The first reproduction method may include reproduction of an attack sound according to the motion of the real object. In this case, the second reproduction method may restrict reproduction of the attack sound.

The second reproduction method may include at least one of fade-in of the audio content or fade-out of the audio content.

The information processing apparatus may further include a first determination unit that determines whether or not the real object is operated by a user. In this case, the reproduction control unit may control the reproduction of the audio content on the basis of a determination result of the first determination unit.

The information processing apparatus may further include an acquisition unit capable of acquiring detection information including at least one of information regarding a state of the user or information regarding a surrounding state. In this case, the first determination unit performs the determination on the basis of the acquired detection information.

The first determination unit may perform the determination on the basis of a distance between the real object and the user.

The first determination unit may perform the determination on the basis of a motion of the user.

The information processing apparatus may further include a second determination unit that determines a degree of interest of the user about the real object. In this case, the reproduction control unit may control the reproduction of the audio content on the basis of a determination result of the second determination unit.

The information processing apparatus may further including an acquisition unit capable of acquiring the detection information including at least one of information regarding a state of the user or information regarding a surrounding state. In this case, the second determination unit may perform the determination on the basis of the acquired detection information.

The information processing apparatus may further include an acquisition unit capable of acquiring the detection information including at least one of information regarding a state of the user or information regarding a surrounding state. In this case, the reproduction control unit may control the reproduction of the audio content on the basis of the acquired detection information.

The reproduction control unit may control the reproduction of the audio content on the basis of a surrounding environmental sound.

The reproduction control unit may control the reproduction of the audio content on the basis of the number of operations of the user on the real object.

The reproduction control unit may select one or more pieces of sensor information that are references for reproduction control of a plurality of pieces of sensor information generated on the basis of the motion of the real object and control time information regarding acquisition of the selected one or more pieces of sensor information on the basis of the reproduction of the audio content.

The reproduction control unit may select earliest acquired sensor information of the plurality of pieces of sensor information as one or more pieces of sensor information that are references for the reproduction control.

The reproduction control unit may start the reproduction of the audio content in response to the acquisition of the sensor information and determines whether or not to continue the reproduction of the audio content on the basis of whether or not information regarding continuation of the reproduction of the audio content has been acquired.

The reproduction control unit may control the reproduction of the audio content on the basis of whether or not other audio content different from the audio content corresponding to the motion of the real object is reproduced.

An information processing method according to an embodiment of the present technology is an information processing method executed by a computer system, the method including controlling, on the basis of time information regarding acquisition of sensor information generated on the basis of a motion of a real object, reproduction of audio content corresponding to the motion of the real object by a first reproduction method in a case where the time information is within a predetermined time range and controls the reproduction of the audio content by a second reproduction method in a case where the time information is out of the predetermined time range.

A recording medium on which a program is recorded according to an embodiment of the present technology causes a computer system to execute the following step.

A step of controlling, on the basis of time information regarding acquisition of sensor information generated on the basis of a motion of a real object, reproduction of audio content corresponding to the motion of the real object by a first reproduction method in a case where the time information is within a predetermined time range and controls the reproduction of the audio content by a second reproduction method in a case where the time information is out of the predetermined time range.

BRIEF DESCRIPTION OF DRAWINGS

FIG. 14 A diagram showing examples of audio content depending on various scenes.

MODE(S) FOR CARRYING OUT THE INVENTION

Hereinafter, embodiments according to the present technology will be described with reference to the drawings.

First Embodiment

[Audio AR System]

Figure 1:
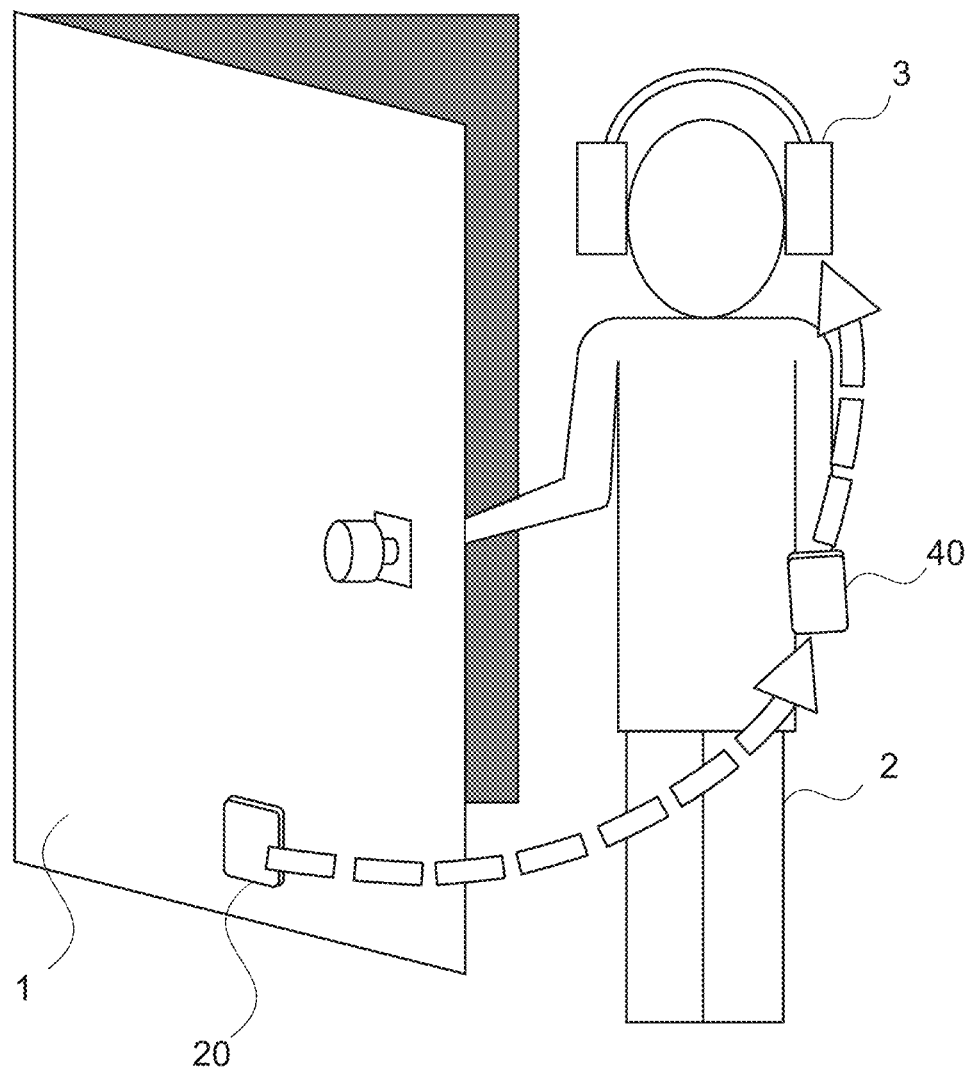
FIG. 1 A schematic diagram for describing the outline of an audio AR system according to a first embodiment of the present technology.

FIG. 1 is a schematic diagram for describing the outline of an audio AR system according to a first embodiment of the present technology. The audio AR system corresponds to an embodiment of an information processing system according to the present technology.

An audio AR system 100 can provide a user with an aural augmented reality (AR) experience. For example, virtual audio content that does not occur in reality is output from headphones or the like that the user wears. Accordingly, the user can enjoy a variety of virtual experiences.

It should be noted that the application of the present technology is not limited to the AR system in which only the virtual audio content is reproduced. The present technology can be applied to an AR system capable of providing image content, a haptic feedback, and the like in addition to the audio content. That is, the present technology can also be applied to an AR system capable of providing not only aural AR experiences but also visual AR experiences and haptic AR experiences.

In this embodiment, the provision of the audio AR according to the opening/closing of a door 1 as shown in FIG. 1 will be exemplified. That is, in this embodiment, the description will be given by exemplifying the opening/closing of the door 1 that is a real object and the motion of the real object.

As a matter of course, the real object and the motion of the real object are not limited. Examples of the motion of the real object include opening/closing of the real object, sliding of the real object, a rotational motion of the real object, and a movement of the real object. Specific examples include moving a stuffed toy or a robot, operating an operation device such as a button, a lever, and a handle, and operating a movable object such as a vehicle. In addition to this, it also includes operating an item in a specific place where the real space and content of a game or the like are linked or a small tool that is a real object, such as a water faucet. The present technology can be widely applied for reproduction of virtual audio content in accordance with various real objects and motions of the real objects.

The audio AR system 100 includes a communication terminal 20 installed in the door 1, a communication terminal 40 carried by a user 2, and headphones 3 worn by the user 2. The communication terminal 40 corresponds to an embodiment of an information processing apparatus according to the present technology. The communication terminal 20 installed in the door 1 corresponds to an embodiment of a sensor device according to the present technology.

When the user 2 opens the door 1, the communication terminal 20 senses the motion of the door 1 and generates sensor information based on the motion of the door 1. The communication terminal 20 sends the sensor information based on the motion of the door 1 to the communication terminal 40.

The sensor information includes any information based on the motion of the door 1. In this embodiment, an event ID representing an event in which the door 1 opens is used as the sensor information. As a matter of course, information different from the event ID may be used as information indicating the event in which the door 1 opens. Alternatively, information different from the information indicating the event in which the door 1 opens may be used as the sensor information. For example, a raw value such as acceleration detected by a sensor unit 25 of the communication terminal 20 (see FIG. 2) on the basis of the motion of the door 1 (detection value) may be used as the sensor information.

The communication terminal 40 controls the reproduction of the audio content corresponding to the opening motion of the door 1 on the basis of the sensor information based on the motion of the door 1 sent from the communication terminal 20. For example, the reproduction of the audio content including virtual sounds, such as "CLICK!" and "CREAK", similar to sounds actually generated when the door 1 opens is controlled.

As a matter of course, a sound different from the sound actually generated when the door 1 opens may be reproduced as the virtual sound. For example, the voice saying "Hahaha! Welcome to Horror Land", for example, may be output.

The communication terminal 40 controls the reproduction of the audio content by the headphones 3. That is, the sound output from the headphones 3 worn by the user 3 is controlled as appropriate. For example, open-air headphones, neck-hanging headphones, or the like are used as the headphones 3. As a matter of course, the present technology is not limited thereto, and headphones having any other configuration may be used.

Moreover, the present technology can also be applied to a case where a wearable device such as a smartwatch or a speaker incorporated in a smartphone or the like is used. For example, a speaker incorporated in the communication terminal 40 may reproduce the audio content corresponding to the motion of the door 1. In addition, the present technology can be applied to any audio output device.

Alternatively, for example, the communication terminal 40 itself may be configured as the headphones. That is, headphones equipped with the function of the communication terminal 40 may be used as the information processing apparatus according to the present technology. As a matter of course, it may be configured as the open-air headphones.

Alternatively, an eyeglasses-type head-mounted display (HMD) equipped with a see-through display may be configured as the information processing apparatus according to the present technology. In this case, various types of audio content are reproduced from a speaker or the like mounted on the HMD. Moreover, the visual AR can be experienced by superimposing a virtual object image on the real space. Accordingly, a high-quality virtual experience is realized. In addition, various apparatuses can realize the information processing apparatus according to the present technology.

It should be noted that the method of communicably connecting the communication terminal 20, the communication terminal 40, and the headphones 3 is not limited. For example, wireless LAN communication such as Wi-Fi or short-range wireless communication such as Bluetooth (registered trademark) can be used. In addition, any wireless or wired connection form may be used.

With such an audio AR, the user 2 can hear a virtual sound of a horror scene, a door of a mountain shed, or the like in response to an operation of a real object, for example. As a result, the user 2 can have an audio AR experience remote from everyday life.

Figure 2:
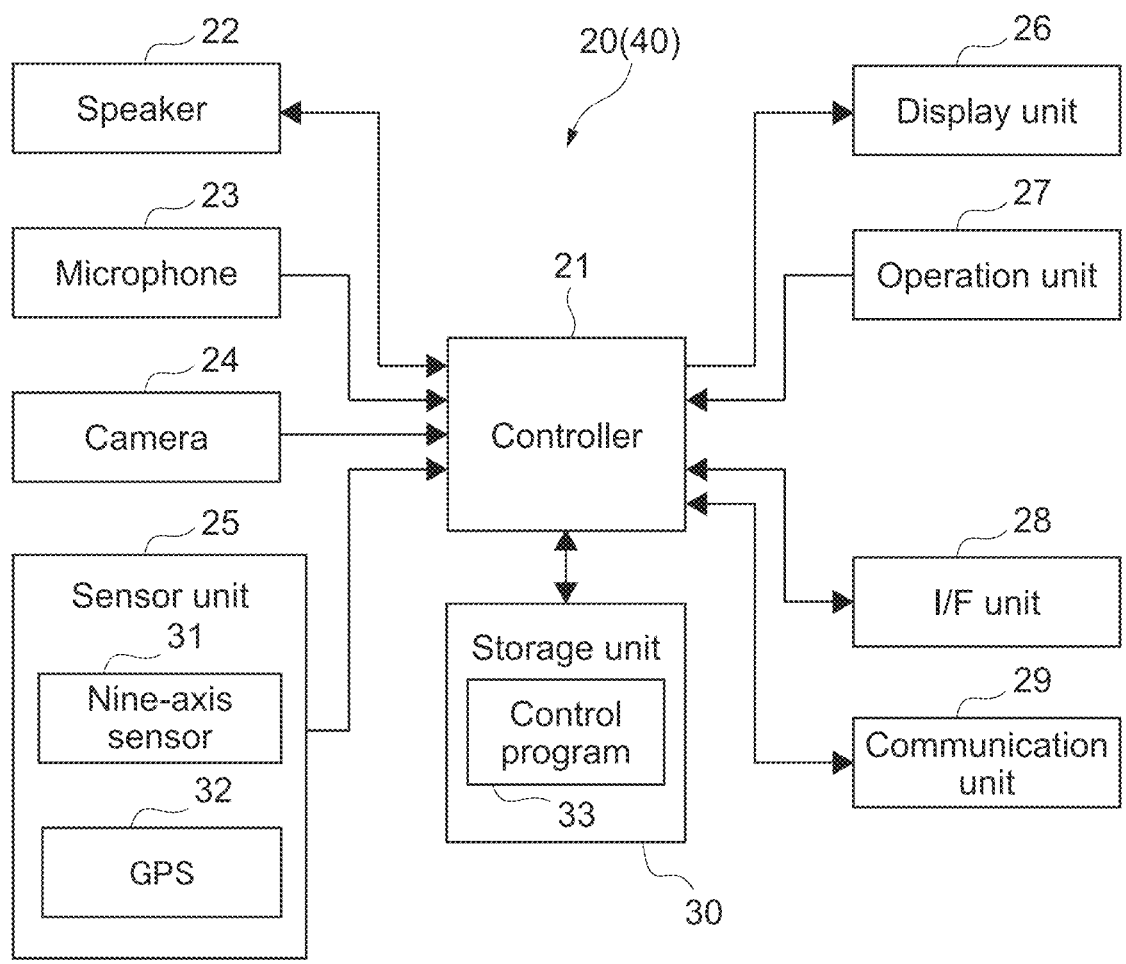
FIG. 2 A block diagram showing a configuration example of a communication terminal.

FIG. 2 is a block diagram showing a configuration example of the communication terminals 20 and 40. In this embodiment, in order to simplify the description, it is assumed that the communication terminals 20 and 40 have the same configurations. As a matter of course, the present technology is not limited thereto, and the communication terminals 20 and 40 may have different configurations.

The communication terminal 20 and the communication terminal 40 each include a controller 21, a speaker 22, a microphone 23, a camera 24, and the sensor unit 25. The communication terminal 20 and the communication terminal 40 each further include a display unit 26, an operation unit 27, an interface unit (I/F) 28, a communication unit 29, and a storage unit 30.

The speaker 22 is capable of outputting various sounds. The specific configuration of the speaker 22 is not limited.

The microphone 23 is capable of acquiring sounds generated around it. For example, the microphone 23 of the communication terminal 20 is capable of detecting and acquiring a sound generated due to opening/closing of the door 1 or a surrounding environmental sound.

The microphone 23 of the communication terminal 40 is capable of detecting and acquiring a surrounding environmental sound of the user 2 and a voice uttered by the user 2. Moreover, when the user 2 operates the door 1, the microphone 23 is capable of detecting a sound generated due to the operation. The specific configuration of the microphone 23 is not limited.

The camera 24 is capable of imaging the surroundings and generating an image of the surroundings (image data). For example, the camera 24 of the communication terminal 20 is capable of imaging the periphery of the door 1 and the face, the whole body, or the like of the person who operates the door 1. Hereinafter, imaging an object and generating an image of the object by the camera 24 will be referred to as capturing an image of the object in some cases.

The camera 24 of the communication terminal 40 is capable of capturing an image of the periphery of the user. For example, when the user 2 operates the door 1, the camera 24 is capable of imaging a state of the operated door 2. For example, a state in which the door 1 is opened or a state in which the door 1 is closed is imaged.

For example, a digital camera including an image sensor such as a complementary metal-oxide semiconductor (CMOS) sensor or a charge coupled device (CCD) sensor is used as the camera 24. Alternatively, for example, an infrared camera equipped with an infrared illumination such as an infrared LED may be used.

The sensor unit 25 includes a nine-axis sensor 31 and a GPS 32. The nine-axis sensor 31 includes a three-axis acceleration sensor, a three-axis gyroscope, and a three-axis compass sensor. The nine-axis sensor 31 is capable of detecting an angle, a movement, and a change in orientation of the communication terminal 20 (40). The GPS 32 is capable of outputting positional information of the communication terminal 20 (40).

For example, the sensor unit 25 of the communication terminal 20 is capable of detecting a movement, an attitude, an orientation, and the like of the door 1. Moreover, the GPS 32 is capable of detecting positional information of the door 1 to which the communication terminal 20 is attached. The sensor unit 25 of the communication terminal 40 is capable of detecting a movement, an attitude, an orientation, and the like of the user 2. The sensor unit 25 is also capable of detecting positional information of the user 2.

The type of the sensor provided as the sensor unit 25 is not limited, and an arbitrary sensor may be provided. For example, a biological sensor or the like capable of detecting the body temperature, the pulse rate, and the like of the user 2 may be provided. Alternatively, a temperature sensor, a humidity sensor, or the like capable of measuring the temperature, humidity, or the like of the surrounding environment may be provided. It should be noted that the microphone 23 and the camera 24 shown in FIG. 2 may function as the sensor unit 25.

The display unit 26 is a display device using, for example, liquid crystal, electro-luminescence (EL), or the like and displays various images, various graphical user interfaced (GUIs), and the like. Examples of the operation unit 27 include a keyboard, a pointing device, a touch panel, and other operation devices. In a case where the operation unit 27 includes a touch panel, the touch panel may be integrated with the display unit 26.

The I/F unit 28 is an interface to which other devices such as a universal serial bus (USB) terminal and a high-definition multimedia interface (HDMI) (registered trademark) terminal and various cables are connected.

The communication unit 29 is a communication module for communicating with another device, and a wireless local area network (LAN) module such as Wi-Fi or a communication module for short-range wireless communication such as Bluetooth (registered trademark) is used, for example. In this embodiment, communication between the communication terminal 20 and the communication terminal 40 is performed via the communication unit 29.

The controller 21 controls the operation of each of the blocks included in the communication terminal 20 and the communication terminal 40. The controller 21 includes hardware necessary for a computer configuration, such as a CPU (processor), a ROM, a RAM, and an HDD, for example. An information processing method according to the present technology is performed by the CPU loading a program according to the present technology (e.g., an application program), which is recorded in advance in the ROM or the like, into the RAM and executing the program.

The specific configuration of the controller 21 is not limited, and any hardware such as a GPU, a field programmable gate array (FPGA), and an application specific integrated circuit (ASIC) may be used.

The program is installed in the communication terminal 20 and the communication terminal 40 via various recording media, for example. Alternatively, the program may be installed via the Internet, for example. As a matter of course, the method of installing the program into the communication terminal 20 and the method of installing the program into the communication terminal 40 do not need to be the same, and different methods may be used.

The type and the like of a recording medium on which the program according to the present technology is recorded are not limited, and any computer-readable recording medium may be used. For example, any non-transitory data recording medium may be used.

The communication terminal 20 and the communication terminal 40 can be realized by, for example, a smartphone, a tablet terminal, a wearable device, a sensor device, or the like. As a matter of course, the present technology is not limited thereto, and any computer device may be used. For example, any device capable of sensing the motion of the door 1 and sending the sensor information may be used as the communication terminal 20. Alternatively, any device capable of receiving the sensor information and controlling the reproduction of the audio content corresponding to the motion of the door 1 on the basis of the received sensor information may be used as the communication terminal 40.

As a matter of course, the communication terminal 20 may be realized by cooperation of a device having the sensing function and a device having the communication function. Alternatively, the communication terminal 40 may be realized by cooperation of a device having the communication function and a device having the function of controlling the reproduction of the audio content.

In the following description, blocks of the blocks shown in FIG. 2, which the communication terminal 20 includes, will be shown, denoted by the reference signs with "a" in some cases. Moreover, blocks that the communication terminal 20 includes will be shown, denoted by the reference signs with "b" in some cases. For example, the speaker 22 that the communication terminal 20 includes will be referred to as a "speaker 22a" in some cases. The speaker 22 that the communication terminal 40 includes will be referred to as a "speaker 22b" in some cases.

Figure 3:
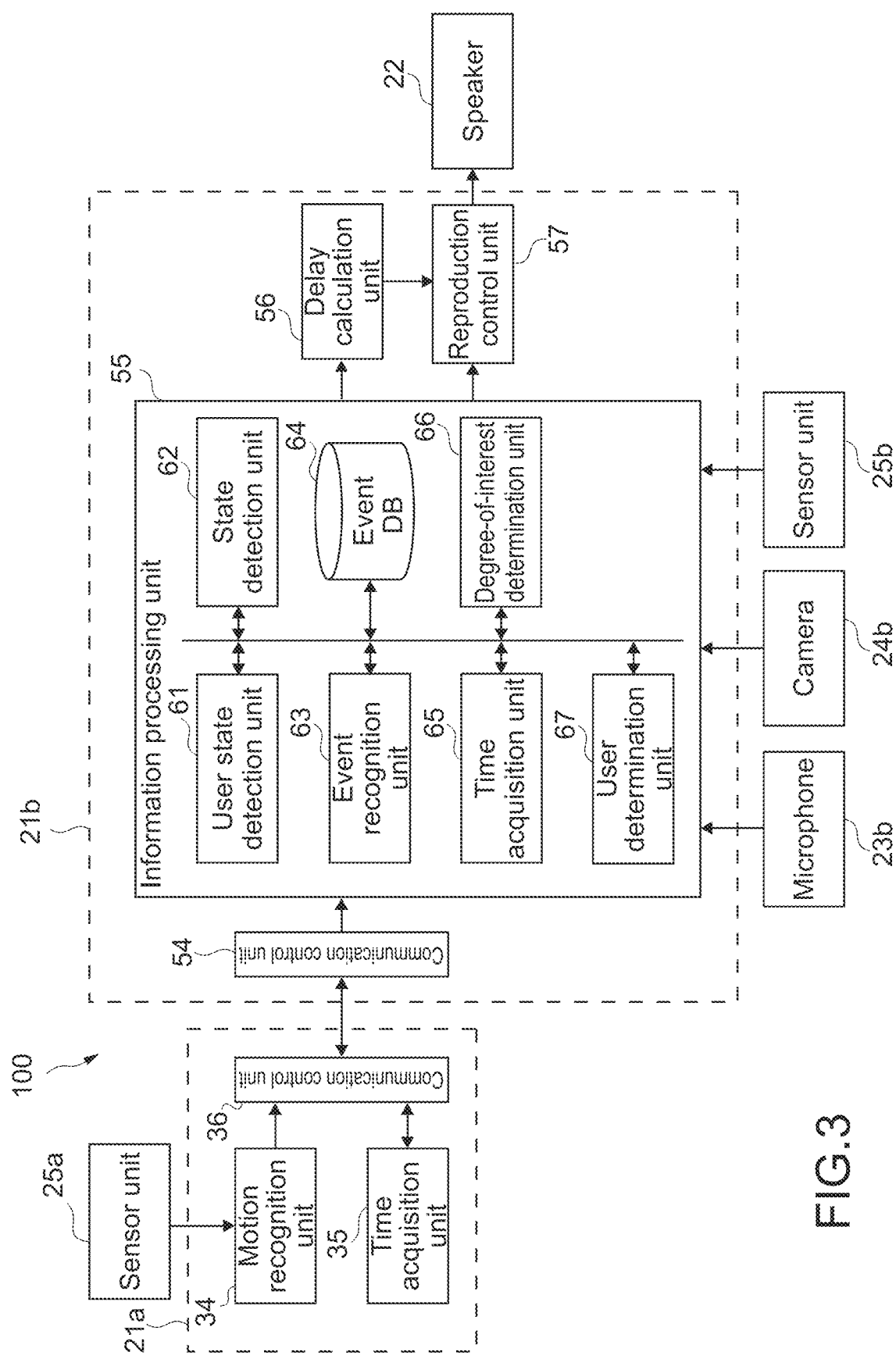
FIG. 3 A block diagram of a functional configuration example of the audio AR system.

FIG. 3 is a block diagram showing a functional configuration example of the audio AR system 100.

In this embodiment, a motion recognition unit 34, a time acquisition unit 35, and a communication control unit 36 are realized as functional blocks by the CPU or the like of the controller 21a of the communication terminal 20 executing the program according to this embodiment. Further, in order to realize each block, dedicated hardware such as an integrated circuit (IC) may be used.

Moreover, a communication control unit 54, an information processing unit 55, a delay calculation unit 56, and a reproduction control unit 57 are realized as functional blocks by the CPU or the like of the controller 21b of the communication terminal 40 executing the program according to this embodiment. Further, in order to realize each block, dedicated hardware such as an integrated circuit (IC) may be used.

The motion recognition unit 34 recognizes the motion of the door 1 on the basis of the detection result of the sensor unit 25a of the communication terminal 20. For example, the motion recognition unit 34 is capable of recognizing the opening motion of the door 1, the closing motion of the door 1, the motion speed, and the like on the basis of a change in acceleration and the like. Moreover, the motion recognition unit 34 is also capable of recognizing that the door 1 is knocked and the like. As a matter of course, the motion of the door 1 may be recognized on the basis of an image captured by the camera 24a of the communication terminal 20, a sound acquired by the microphone 23a, and the like.

The motion recognition unit 34 generates an event ID associated with the recognized motion of the door 1 and supplies the event ID to the communication control unit 36. For example, when the door 1 opens, the event ID "001" is supplied, and when the door 1 is closed, the event ID "001" is supplied. Different event IDs may be generated depending on the opening speed of the door 1.

The specific method of recognizing the motion of the door 1 is not limited, and any technology may be used. Any machine-learning algorithm using a deep neural network (DNN) or the like may be used, for example. For example, the use of artificial intelligence (AI) or the like for performing deep learning can improve the recognition accuracy of the motion of the door 1.

The time acquisition unit 35 acquires time information when the communication control unit 36 sends the event ID associated with the motion of the door 1 recognized by the motion recognition unit 34 to the other device (the communication terminal 40). For example, a time stamp or the like is used as the time information. Actual time information may be used as the time stamp or clock information that uniquely increases with reference to a common reference time may be used. The method of acquiring the time information is not limited, and any method may be employed. For example, the time from long term evolution (LTE) or the like may be used.

It should be noted that the communication terminal 20 may send a time stamp when the event ID is generated, together with the event ID. In this case, an arrival time from a time at which the communication terminal 20 generates the sensor information (in this embodiment, the event ID) to a time at which the communication terminal 20 acquires the sensor information is calculated as an amount of delay.

The communication control unit 36 controls communication with the communication terminal 40. In this embodiment, the communication control unit 36 controls the operation of the communication unit 29 shown in FIG. 2, such that various types of information (data) can be sent to the communication terminal 40.

In this embodiment, the communication control unit 36 sends the event ID associated with the motion of the door 1 and the time stamp in a set to the communication terminal 40.

As also described above, in this embodiment, the event ID associated with the motion of the door 1 recognized by the motion recognition unit 34 corresponds to the sensor information generated on the basis of the motion of the real object. As a matter of course, the present technology is not limited thereto, and other information may be used. For example, a raw value (detection value) or the like of the sensor unit 25a input into the motion recognition unit 34 may be sent to the communication terminal 40 as the sensor information. Then, the motion of the door 1 may be recognized at the communication terminal 40.

The communication control unit 54 of the communication terminal 40 controls communication with the communication terminal 20. In this embodiment, the communication control unit 54 controls the operation of the communication unit 29b of the communication terminal 40, such that various types of information (data) can be received from the communication terminal 20. As a matter of course, it is also possible to send various types of information (data) from the communication terminal 40 to the communication terminal 20.

The communication control unit 54 supplies the event ID and the time stamp received from the communication terminal 20 to the information processing unit 55.

The information processing unit 55 includes a user state detection unit 61, a state detection unit 62, an event recognition unit 63, an event DB 64, a time acquisition unit 65, a degree-of-interest determination unit 66, and a user determination unit 67.

The user state detection unit 61 is capable of detecting state information regarding a state of the user 2 on the basis of the detection result (sensing result) of the sensor unit 25b of the communication terminal 40, the sound (audio data) acquired by the microphone 23b, the image (image data) captured by the camera 24b, and the like.

As the state information of the user 2, it is possible to detect various types of information regarding the user 2 such as an attitude, a motion, a position, the contents of utterances, and the like of the user 2, for example. For example, information indicating walking, running, moving by train, driving, and the like and information indicating the type of sports played and the like are detected as the state information of the user 2. Moreover, it is also possible to detect a gesture, a line-of-sight direction, and the like of the user 2.

For example, it is possible to detect an operation on the door 1, a footsteps sound of the user 2, the contents of utterances of the user 2, whether or not the user is gazing at the door 1, whether or not the user is communicating with other persons, and the like. The present technology is not limited thereto, and it is possible to detect any action of the user 2.

The state detection unit 62 is capable of detecting state information regarding a surrounding state on the basis of the detection result (sensing result) of the sensor unit 25b, the sound (audio data) acquired by the microphone 23b, the image (image data) captured by the camera 24b, and the like. For example, it is possible to detect the type of the place where the user 2 is located, a surrounding environmental sound, the type of the real object existing in the periphery, a distance between the real object and the user 2, a motion of the real object, a sound emitted by the real object, and the like.

For example, it is possible to detect various types of state information such as a motion of the door 1, a sound emitted from the door 1, motions of other persons located in the periphery, the contents of an utterance of another person, a footsteps sound of another person, whether it is indoors or outdoors, surrounding brightness, and the weather.

The various types of state information of the user 2 and the various types of surrounding state information can be detected by any technology such as behavior analysis with machine learning, for example.

It should be noted that the sensing result, the audio data, and the image data acquired by the communication terminal 20 may be input to the user state detection unit 61 and the state detection unit 62 via the communication control units 36 and 54. Based on the input information, the state information of the user and the surrounding state information may be detected.

Alternatively, the communication terminal 20 may also include the user state detection unit 61 and the state detection unit 62. The state information of the user 2 and the surrounding state information, which are detected by the communication terminal 20, may be sent to the communication terminal 40.

In this embodiment, the state information of the user and the surrounding state information are included in detection information. A configuration in which only the state information of the user is detected or a configuration in which only the surrounding state information is detected may be employed. Moreover, it is not essential to clearly distinguish the state information of the user and the surrounding state information from each other. Information regarding the state of the user and information regarding the surrounding state may be comprehensively detected as the detection information.

In this embodiment, the user state detection unit 61 and the state detection unit 62 function as an acquisition unit capable of acquiring detection information including at least one of information on the state of the user and information on the surrounding state.

The event recognition unit 63 recognizes the contents of the event from the event ID supplied by the communication control unit 54. For example, when the event ID stored in the event DB 64 matches the supplied event ID, it is recognized that the event occurred in the real space.

Moreover, the event recognition unit 63 is also capable of recognizing the event occurring in the real space on the basis of the detection result (sensing result) of the sensor unit 25, the sound (audio data) acquired by the microphone 23, the image (image data) captured by the camera 24, and the like. For example, an event in which the door 1 opens is recognized on the basis of a sound of opening the door 1. The event recognition unit 63 may be configured as a function of the user state detection unit 61 and the state detection unit 62.

The event ID associated with the contents of the event is stored in the event DB 64. The event ID to be stored is not limited. In this embodiment, an event DB 64 is constructed by the HDD and the like inside the controller 21. The present technology is not limited thereto, and an event DB 64 may be constructed by a storage device and the like provided outside the controller 21.

The event DB 64 may store information regarding the order of events. For example, in a case where there are an event ID of an event in which a bullet is fired and an event ID of an event in which the bullet hits an object, information indicating that the event in which a bullet is fired is followed by the event in which the bullet hits may be stored. Alternatively, the motion of the real object may be determined by receiving a signal from a sensor terminal or a dedicated line for sending only specific sensor information in place of the event ID, for example.

The time acquisition unit 65 acquires time information when receiving an event ID and a time stamp from the communication terminal 20. In this embodiment, a time stamp is used. That is, a time stamp at a time at which the event ID and the time stamp are received is acquired.

The degree-of-interest determination unit 66 determines a degree of interest of the user 2 with respect to the real object. The degree of interest is a parameter indicating how much the user 2 is interested in the real object or is concerned with the real object. In this embodiment, for example, the degree of interest of the user 2 with respect to the door 1 is determined. The determination of the degree-of-interest determination unit 66 will be described later in detail.

In this embodiment, the degree-of-interest determination unit 66 functions as a second determination unit. The degree-of-interest determination unit 66 may be configured as a function of the user state detection unit 61 and the state detection unit 62. In this case, the degree-of-interest determination unit 66 also functions as an acquisition unit.

The user determination unit 67 determines whether or not the door 1 is operated by the user 2. For example, the user determination unit 67 determines whether or not the door 1 is operated by the user 2 on the basis of a distance between the door 1 and the user 2 detected as the detection information, for example. As a matter of course, other determination methods may be used.

In this embodiment, the user determination unit 67 functions as a first determination unit. The user determination unit 67 may be configured as a function of the user state detection unit 61 and the state detection unit 62. In this case, the user determination unit 67 also functions as an acquisition unit.

Based on the time information supplied from the time acquisition unit 35 and the time acquisition unit 65, the delay calculation unit 56 calculates an amount of delay (latency) until the communication terminal 40 receives the sensor information (event ID in this embodiment) sent from the communication terminal 20.

In this embodiment, the amount of delay is calculated by the time stamp sent together with the event ID and the time stamp at a time of receiving the event ID. That is, in this embodiment, an arrival time from a time at which the communication terminal 20 sends the sensor information to the communication terminal 40 to a time at which the communication terminal 20 acquires the sensor information is calculated as the amount of delay.

In this embodiment, the amount of delay (arrival time) corresponds to time information regarding acquisition of the sensor information generated on the basis of the motion of the real object.

The reproduction control unit 57 controls the reproduction of the audio content corresponding to the event recognized by the event recognition unit 63. In this embodiment, the reproduction of the audio content corresponding to the motion of the door 1 is controlled on the basis of the amount of delay, i.e., the arrival time.

For example, as the first reproduction control, the reproduction control unit 57 controls the reproduction of the audio content corresponding to the motion of the door 1 by the first reproduction method in a case where the amount of delay (arrival time) is within a predetermined time range. Otherwise, as the second reproduction control, in a case where the amount of delay (arrival time) is out of the predetermined time range, the reproduction of the audio content corresponding to the motion of the door 1 is controlled by a second reproduction method different from the first reproduction method.

That is, the reproduction control unit 57 can control the reproduction of the audio content corresponding to the event by a different reproduction method between a case where the calculated delay is within the predetermined time range and a case where the calculated amount of delay is out of the predetermined time range. Specific examples of the reproduction method according to the amount of delay will be described later in detail.

Moreover, the reproduction control unit 57 is also capable of controlling the reproduction of the audio content on the basis of the detection information including the state information of the user and the surrounding state information, the determination result of the degree-of-interest determination unit 66, and the determination result of the user determination unit 67.

Moreover, the reproduction control unit 57 is also capable of controlling the reproduction of the audio content on the basis of the order of events stored in the event DB.

It should be noted that the present technology is not limited to the case where the event ID is used, and it is also possible to perform the reproduction of the audio content corresponding to the motion of the real object even without the event ID. For example, it is assumed that the configuration in which the motion of the real object is determined by receiving the signal from the sensor terminal or the dedicated line for sending only specific sensor information in place of the event ID as described above is employed. In this case, it is possible to reproduce the audio content corresponding to the determined motion of the real object on the basis of the signal from the sensor terminal or the dedicated line. Alternatively, both the reproduction of the audio content based on the event ID and the reproduction of the audio content without the event ID may be performed.

Figure 4:
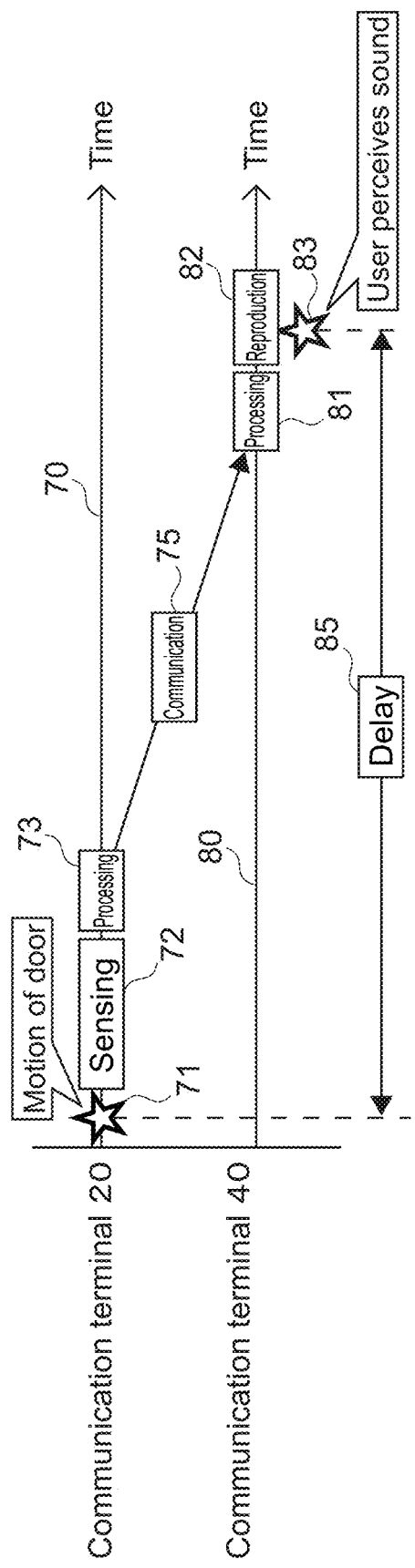
FIG. 4 A schematic diagram for describing a delay that occurs after the start of a motion of a real object to the output of audio content from the communication terminal.

FIG. 4 is a schematic diagram for describing a delay that occurs from the start of the motion of the real object to the output of the audio content from the communication terminal 40.

A straight line 70 indicates a time axis of the communication terminal 20 and the time elapses in the arrow direction. A straight line 80 indicates a time axis of the communication terminal 40 and the time elapses in the arrow direction.

A star mark 71 represents a timing at which the door 1 moved. Here, a case where the door 1 is opened will be exemplified. The sensor unit 25 of the communication terminal 20 performs sensing 72 in response to the opening motion of the door 1.

Processing 73 of FIG. 4 indicates processes performed by the motion recognition unit 34, the time acquisition unit 35, and the communication control unit 36 as a single process. That is, the motion recognition unit 34 recognizes the opening of the door 1, and the event ID associated with the opening of the door 1 is supplied to the communication control unit 36. The time acquisition unit 35 acquires a time stamp at a timing of sending of the communication control unit 36. The communication control unit 36 sends an event ID and a time stamp.

Communication 75 of FIG. 4 represents that the event ID and the time stamp are communicated. That is, it represents communication processing until the event ID and the time stamp sent from the communication terminal 20 reach the communication terminal 40.

Processing 81 of FIG. 4 indicates processes performed by the communication control unit 54, the information processing unit 55, the delay calculation unit 56, and the reproduction control unit 57 of the communication terminal 40 as a single process.

In this embodiment, the communication control unit 54 supplies the event ID to the event recognition unit 63 and supplies the time stamp to the time acquisition unit 65. The event recognition unit 63 recognizes an event indicating that the door 1 is opened on the basis of the supplied event ID. The time acquisition unit 65 acquires a time stamp (time at which processing 81 is performed) at a time of receiving the supplied time stamp (time at which processing 73 is performed).

The delay calculation unit 56 calculates the amount of delay from the time stamp at the time of receiving and the time stamp at the time of sending. That is, the time required for the communication 75 is calculated as the amount of delay.

The reproduction control unit 57 controls reproduction of the reproduction content corresponding to the motion of the door 1 on the basis of the amount of delay and the event. Accordingly, the audio content corresponding to the opening motion of the door 1 is reproduced from the headphones 3 mounted on the user 2 (reproduction 82 in FIG. 4).

The star mark 83 indicates a time at which the user 2 perceives the sound of the audio content. As shown in FIG. 4, it takes some time for the human to perceive the sound after the start of the reproduction of the audio content.

The amount of delay 85 in FIG. 4 indicates the time from the star mark 71 when the door moves to the star mark 83 when the user 2 perceives the sound. Factors of the amount of delay 85 include a time required for the processes performed by the communication terminal 20 and the communication terminal 40, a time required for the communication 75 between the communication terminal 20 and the communication terminal 40, and the like. In this embodiment, the reproduction of the audio content is controlled on the basis of the time (amount of delay) for the communication 75.

As a matter of course, it is also possible to control the reproduction of the audio content on the basis of the time required for the processes performed by the communication terminal 20 and the communication terminal 40. For example, in a case where another communication method different from the wireless method is employed, the present technology can be applied by setting the time required for the processes performed by the communication terminal 20 and the communication terminal 40 as the amount of delay.

The amount of delay varies depending on the environment of wireless communication by the communication terminal 20 and the communication terminal 40. For example, when the number of communication terminals capable of communicating with the communication terminal 20 is large, the amount of delay increases. Moreover, for example, also when the amount of communication between the communication terminal 20 and the communication terminal 40 is large, the amount of delay increases. Moreover, the amount of delay also varies depending on the performance of the communication units 29 of the communication terminals 20 and 40.

Controlling the audio content in accordance with the amount of delay as described below makes it possible to provide a high-quality virtual experience to the user 2. That is, it is possible to provide a high-quality audio AR experience according to the amount of delay. For example, it is possible to provide a convincing viewing experience associated with the operation of the user 2 him or herself or the operation viewed by the user 2. Moreover, it is also possible to exert a cross-modal effect of sound and video.

Figure 5:
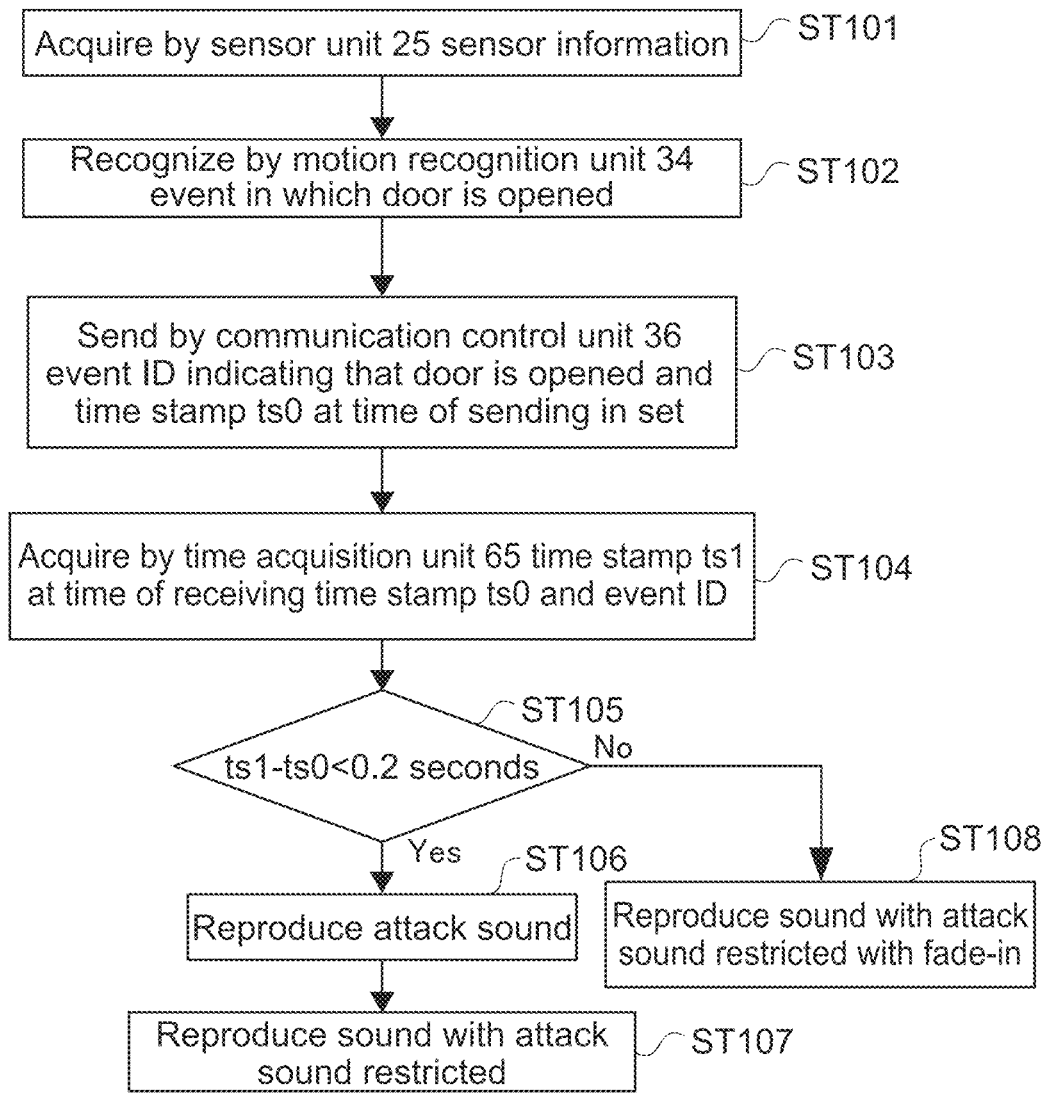
FIG. 5 A flowchart showing a control example of reproduction of the audio content.
Figure 6:
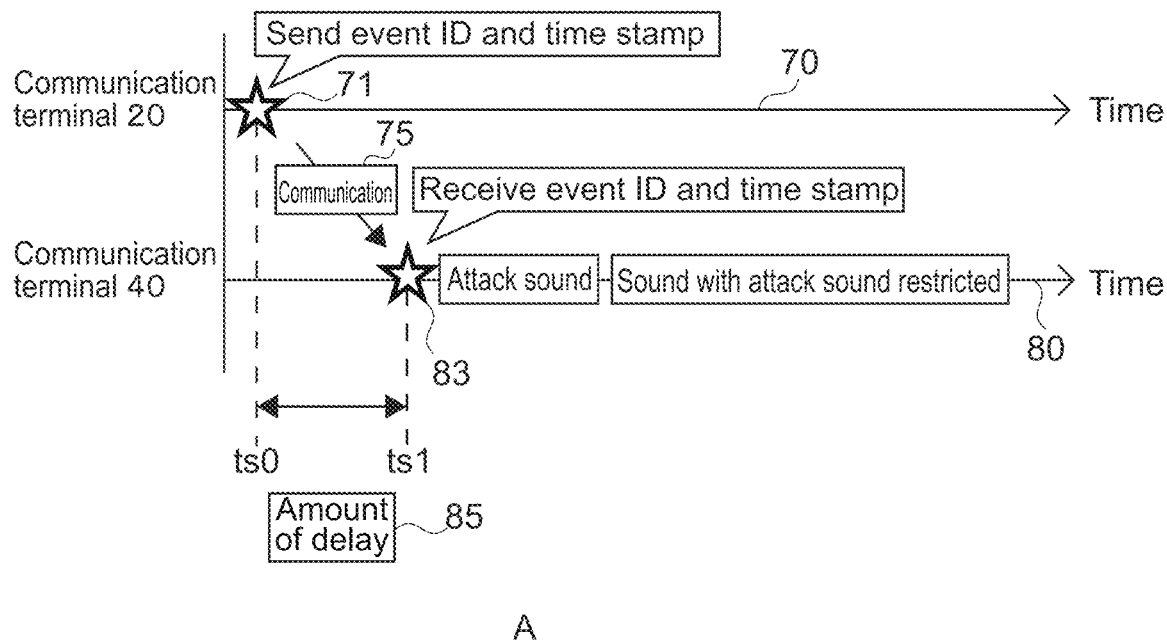
FIG. 6 A schematic diagram for describing a control example of the reproduction of the audio content based on an amount of delay.
Figure 6:
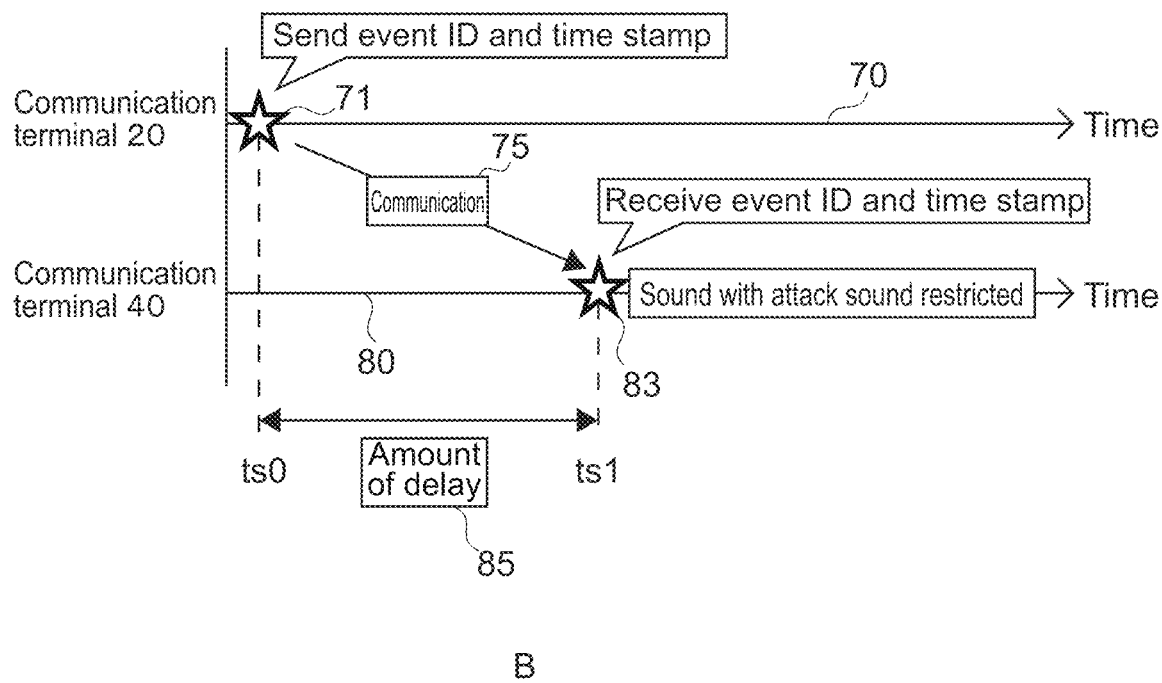

FIG. 5 is a flowchart showing an example of the control of the reproduction of the audio content. FIG. 6 is a schematic diagram for describing a control example of the reproduction of the audio content on the basis of the amount of delay. FIG. 6A is a schematic diagram showing reproduction control in a case where the amount of delay is within the predetermined time range. FIG. 6B is a schematic diagram showing reproduction control in a case where the amount of delay is out of the predetermined time range. Hereinafter, the description will be given with reference to FIGS. 5 and 6.

The door 1 is opened as indicated by the star mark 71 in FIGS. 6A and B. Then, the sensor unit 25 or the like of the communication terminal 20 detects a sensing result based on the motion of the door 1 opens (Step 101). The motion recognition unit 34 recognizes the event in which the door 1 is opened and generates an event ID (Step 102).

The communication control unit 36 of the communication terminal 20 sends the event ID and a time stamp ts0 acquired by the time acquisition unit 35 to the communication terminal 40 (Step 103).

The communication control unit 54 of the communication terminal 40 receives the event ID indicating that the door 1 is opened, which is sent from the communication terminal 20, and the time stamp ts0 at the time of sending. The event recognition unit 63 recognizes that the door 1 is opened as an event that occurs in the real space on the basis of the event ID indicating that the door is opened. Moreover, the time acquisition unit 65 acquires a time stamp ts1 indicating a time at which the event ID is received (Step 104).

The delay calculation unit 56 calculates an amount of delay on the basis of the time stamp ts1 indicating the time of receiving and the time stamp ts0 indicating the time of sending.

The reproduction control unit 57 determines whether or not the calculated amount of delay is within the predetermined time range. In this embodiment, 0.2 seconds are set as the predetermined time range. Therefore, the reproduction control unit determines whether or not the calculated amount of delay is equal to or less than 0.2 seconds (Step 105). As a matter of course, the predetermined time range serving as a criterion for the determination in Step 105 is not limited, and may be arbitrarily set. For example, a shorter time range, e.g., 0.05 seconds, may be set or a longer time range, e.g., 0.5 seconds, may be set.

As shown in FIG. 6A, in a case where the amount of delay 85, which is a time required for the communication 75, is less than 0.2 seconds (YES in Step 105), the reproduction control unit 57 controls the reproduction of the audio content corresponding to the motion of the door 1 by the first reproduction method.

In this embodiment, first, the sound "CLICK!" at a moment at which the door 1 opens is reproduced as an attack sound according to the motion of the door 1 (Step 106). Then, after the attack sound is reproduced, the sound "CREAK" corresponding to the opening motion of the door 1 is reproduced as a sound not including the attack sound (Step 107).

As shown in FIG. 6B, in a case where the amount of delay 85, which is the time required for the communication 75, is 0.2 seconds or more (NO in Step 105), the reproduction control unit 57 controls the reproduction of the audio content corresponding to the motion of the door 1 by the second reproduction method.

In this embodiment, the attack sound "CLICK!" corresponding to the motion of the door 1 is not reproduced and the sound "CREAK" not including the attack sound is reproduced. Moreover, the sound "CREAK" not including the attack sound is reproduced with fade-in.

As described above, the first reproduction method according to this embodiment includes the attack sound according to the motion of the real object. Moreover, in the second reproduction method, the reproduction of the attack sound according to the motion of the real object is restricted. The restriction of the reproduction of the attack sound includes stop of reproduction of the sound defined as the attack sound and restriction of a sound other than the sound defined as the attack sound. Moreover, the restriction of the reproduction of the attack sound includes reproduction of a sound with the attack sound restricted. The attack sound and the sound with the attack sound restricted will be described later in detail.

Moreover, the second reproduction method includes the fade-in of the audio content. It should be noted that the sound "CREAK" reproduced in Step 108 may be faded out as it is. That is, the second reproduction method may include fade-out of the audio content.

As a matter of course, the first reproduction method and the second reproduction method are not limited to such reproduction methods. For example, the first reproduction method may not include the attack sound. Moreover, the second reproduction method may not include the fade-in or the fade-out of the audio content. In order to realize a high-quality viewing experience, the first reproduction method and the second reproduction method may be arbitrarily set.

It is assumed that the attack sound "CLICK!" or the like is reproduced as the audio AR in a case where the amount of delay 85 shown in FIG. 6 is large. In this case, there is a high possibility that the linkage between the actual motion of the door 1 and the virtual sound is impaired and the quality of the virtual experience is significantly lowered. For example, after the user 2 turns the door knob and opens the door 1 wide, the user 2 hears the sound "CLICK!", which makes the user 2 feel a great discomfort.

In this embodiment, the attack sound is reproduced in a case where the amount of delay 85 is within the predetermined range. On the other hand, the reproduction of the attack sound is restricted in a case where the amount of delay is out of the predetermined range. Accordingly, the linkage between the actual motion of the door 1 and the reproduction of the virtual sound is maintained at a high level. As a result, it is possible to provide a high-quality virtual experience.

Moreover, in a case where the amount of delay is out of the predetermined range, the fade-in or fade-out of the audio content is performed. Accordingly, it is possible to further reduce the influence of the gap between the actual motion of the door 1 and the virtual sound, and to improve the quality of the virtual experience. Moreover, the use of the fade-in or the fade-out of the audio content can provide a sense of linkage between the motion of the real object and the sound without preparing many sound sources in advance.

It should be noted that in the example shown in FIG. 6, the reproduction of the attack sound is restricted in Step 108. The present technology is not limited thereto, and the attack sound may be reproduced even in the latter half of the audio content in a case where the amount of delay is within the predetermined range.

Figure 7:
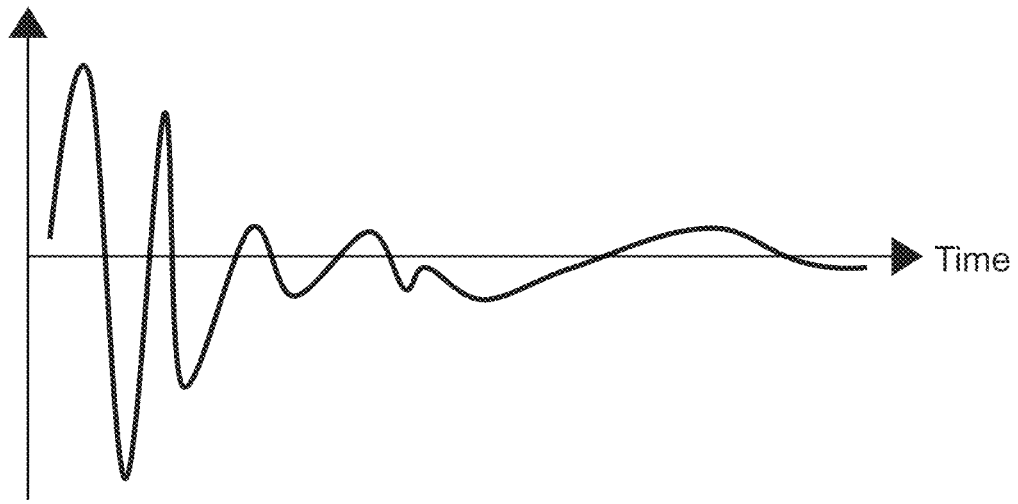
FIG. 7 A schematic diagram for describing an example of an attack sound and a sound with the attack sound restricted.
Figure 7:
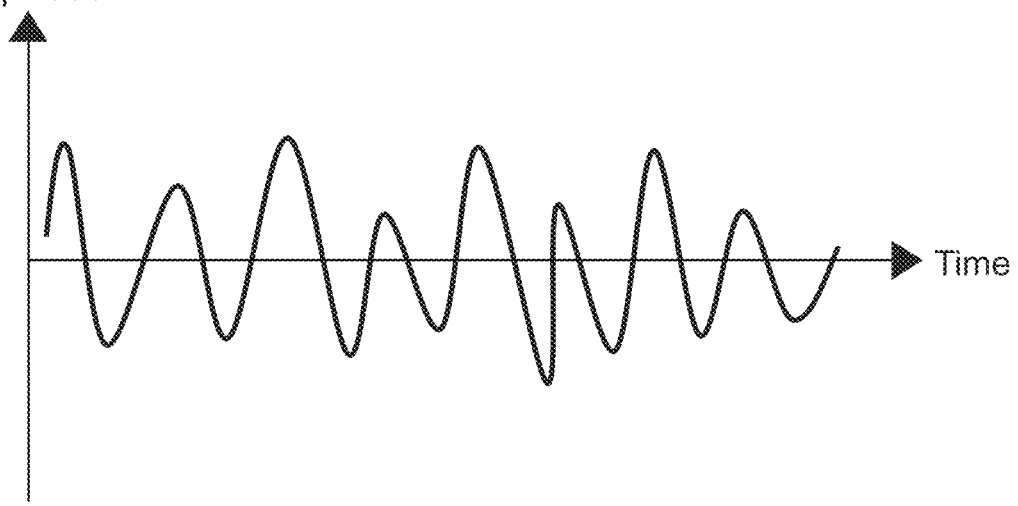

FIG. 7 is a schematic diagram for describing an example of the attack sound and the sound with the attack sound restricted. FIG. 7A is a schematic diagram showing an example of the attack sound. FIG. 7B is a schematic diagram showing an example of the sound with the attack sound restricted.

In the graph of FIG. 7, the horizontal axis indicates time and the vertical axis indicates an amplitude of a waveform. The attack sound and the sound with the attack sound restricted can be defined on the basis of the waveform of the sound, for example.

The attack sound and the sound with the attack sound restricted can be defined on the basis of a change in amplitude in a certain time, for example. As shown in FIG. 7A, a sound having an amplitude that greatly attenuates in the certain time can be defined as the attack sound. The certain time, a threshold value that serves as a criterion for determining whether or not the attenuation is large, and the like may be arbitrarily set. As a matter of course, an amount of attenuation (attenuation rate) from the peak of the amplitude, the peak value, and the like may be used as parameters for defining the attack sound.

Focusing on the shape of the waveform shown illustrated in FIG. 7A, it is also possible to define a sound in which similar waveforms are not repeated as the attack sound. The method of determining whether or not waveforms are similar to each other, the parameter for the determination, and the like may be arbitrarily set.

Examples of the attack sound include the sound "CLICK" generated at the moment of opening the door, the gun sound "BANG", and the sound "WHAM" generated when objects collide with each other. As a matter of course, the attack sound is not limited to those sounds.

As shown in FIG. 7B, a sound in which the rate of change (amount of change) of the amplitude in the certain time is within a predetermined range can be defined as the sound with the attack sound restricted. Moreover, it is possible to define a sound whose amplitude is substantially constant in the certain time as the sound with the attack sound restricted. The certain time, the predetermined range, the threshold value for determining whether or not the amplitude is substantially constant, and the like may be arbitrarily set. As a matter of course, an attenuation amount (attenuation rate) from the peak of the amplitude (attenuation rate) may be used to define the sound as the sound with the attack sound restricted in a case where the attenuation amount (attenuation rate) is less than a predetermined threshold value. Alternatively, the peak value or the like may be used as a determination parameter.

Focusing on the shape of the waveform illustrated in FIG. 7B, it is also possible to define a sound in which similar waveforms are repeated as the attack sound. The method of determining whether or not the waveforms are similar to each other, the parameter for determination, and the like may be arbitrarily set.

Examples of the sound with the attack sound restricted include continuous sounds such as the sound "CREAK" of the door being opened, the sound "RUSTLE" when the fallen leaves rub against each other, the wind noise "WHOOSH" when the window has been opened, and the rain sound "VSSSHH". As a matter of course, the sound with the attack sound restricted is not limited to those sounds.

For example, suppose that another person walks gently on the fallen leaves after stepping hard on the fallen leaves. A communication terminal carried by the other person generates an event ID on the basis of the motion of the other person and sends the event ID together with a time stamp to the communication terminal 40 of the user 2.

In a case where the amount of delay to the reception of the event ID is within the predetermined time range, a virtual attack sound of stepping hard on the fallen leaves is reproduced and then a virtual sound of gently walking on the fallen leaves is reproduced. In a case where the amount of delay is out of the predetermined time range, the sound of the virtual attack sound of stepping hard on the fallen leaves is not reproduced and the virtual sound of gently walking on the fallen leaves is faded in/faded out. For example, it is possible to perform such reproduction control. It should be noted that in this example, the other person corresponds to the real object.

It should be noted that another method may be employed as a method of defining the attack sound and the sound with the attack sound restricted. For example, a sound whose reproduction is terminated within a predetermined time range (e.g., within 0.5 seconds) and is not repeated thereafter may be defined as the attack sound. Alternatively, a sound whose pressure level (amplitude) is equal to or less than half the maximum value within the predetermined time range (e.g., within 0.5 seconds) may be defined as the attack sound.

Alternatively, the sound may be defined as a plurality of attack sounds if the amplitude is larger than a predetermined value even in a case where similar waveforms are repeated.

Alternatively, a sound that makes the user strongly recognize the timing at which the sound is generated may be defined as the attack sound. That is, a sound that makes the user who hears the sound strongly recognize when the sound occurs can be defined as the attack sound. For example, it includes a sudden sound, a sound that can be expressed as a short and strong sound, and the like. For example, a sound whose amount of increase in amplitude per unit time is large, a sound whose amplitude peak value is larger than a predetermined threshold value, or the like can be defined as the attack sound.

Alternatively, the attack sound may be defined by the relevance (linkage) to the motion of the real object. For example, a sound that the user feels uncomfortable when the sound occurs delayed from the motion of the real object may be defined as the attack sound. In this case, the sound can also be defined as an expression different from the attack sound, for example, an expression of a sound having a high temporal relevance or a sound that is not allowed to be deviated from the motion.

The attack sound may be defined by the relevance (linkage) to the user's operation on the real object. For example, a sound that the user feels uncomfortable when the sound occurs delayed from the user's operation may be defined as the attack sound. The sound can also be defined as an expression of an operation-related sound, for example.

Alternatively, a sound generated once for one motion (one operation) may be defined as the attack sound.

Alternatively, for example, a sound whose pressure level changes slowly or the like may be defined as the sound with the attack sound restricted. As a matter of course, the present technology is not limited thereto, and various sounds may be defined as the sound with the attack sound restricted. Examples of the sound with the attack sound restricted include a sound that the user does not feel uncomfortable even when the sound is repeatedly reproduced with respect to one motion of the user or the motion of the real object. As a matter of course, a sound other than the sound defined as the attack sound may be defined as the sound with the attack sound restricted.

It should be noted that as one method of setting the predetermined time range serving as the criterion for the determination in Step 105 of FIG. 5, a sound defined as the attack sound may be actually reproduced and it may be experimentally confirmed how long the amount of delay does not cause a sense of discomfort. Accordingly, it is possible to realize a high-quality virtual experience.

As described above, in the audio AR system 100 according to this embodiment, on the basis of the amount of delay (arrival time) related to the acquisition of the sensor information generated on the basis of the motion of the door 1, the reproduction of the audio content corresponding to the motion of the door 1 is controlled by the first reproduction method in a case where the amount of delay is within the predetermined time range, and the reproduction of the audio content corresponding to the motion of the door 1 is controlled by the second reproduction method in a case where the amount of delay is outside the predetermined time range in a case where the amount of delay is outside the predetermined time range. Accordingly, it is possible to provide a high-quality virtual experience because the audio content can be reproduced in consideration of the amount of delay.

In a case where the motion of the real object is sensed and virtual audio content such as a sound effect is reproduced by the headphones, a good virtual experience cannot be created unless information of the motion detected by the real object is sent to the headphones with a small amount of delay. On the other hand, it is difficult to ensure the amount of delay under congested conditions because of the limited radio bandwidth and processing resources.

Therefore, in the present technology, the reproduction of the audio content is controlled on the basis of the amount of delay of the communication. The reproduction of the audio content is controlled to reproduce a sound such as an attack sound that easily gets attention in a case where the amount of delay is small and to restrict an attack sound that is likely to greatly impair the virtual experience by delaying in a case where the amount of delay is large. Accordingly, it is possible to provide a high-quality virtual experience.

In the present technology, since the reproduction of the audio content is controlled on the basis of the amount of delay of the communication, it is possible to perform an audio AR experience with a small sense of discomfort even in an environment where there are many other users, the radio bandwidth is congested, and the delay often occurs.

Moreover, since the experience is not greatly impaired even when the amount of delay is large, low-power protocols such as Bluetooth low energy (BLE) can be used, and the number of times of charge for the communication terminals on the real object side and carried by the user can be reduced.

Second Embodiment

An audio AR system according to a second embodiment of the present technology will be described. Hereinafter, descriptions of configurations and actions similar to those of the audio AR system 100 described in the above embodiment will be omitted or simplified.

Figure 8:
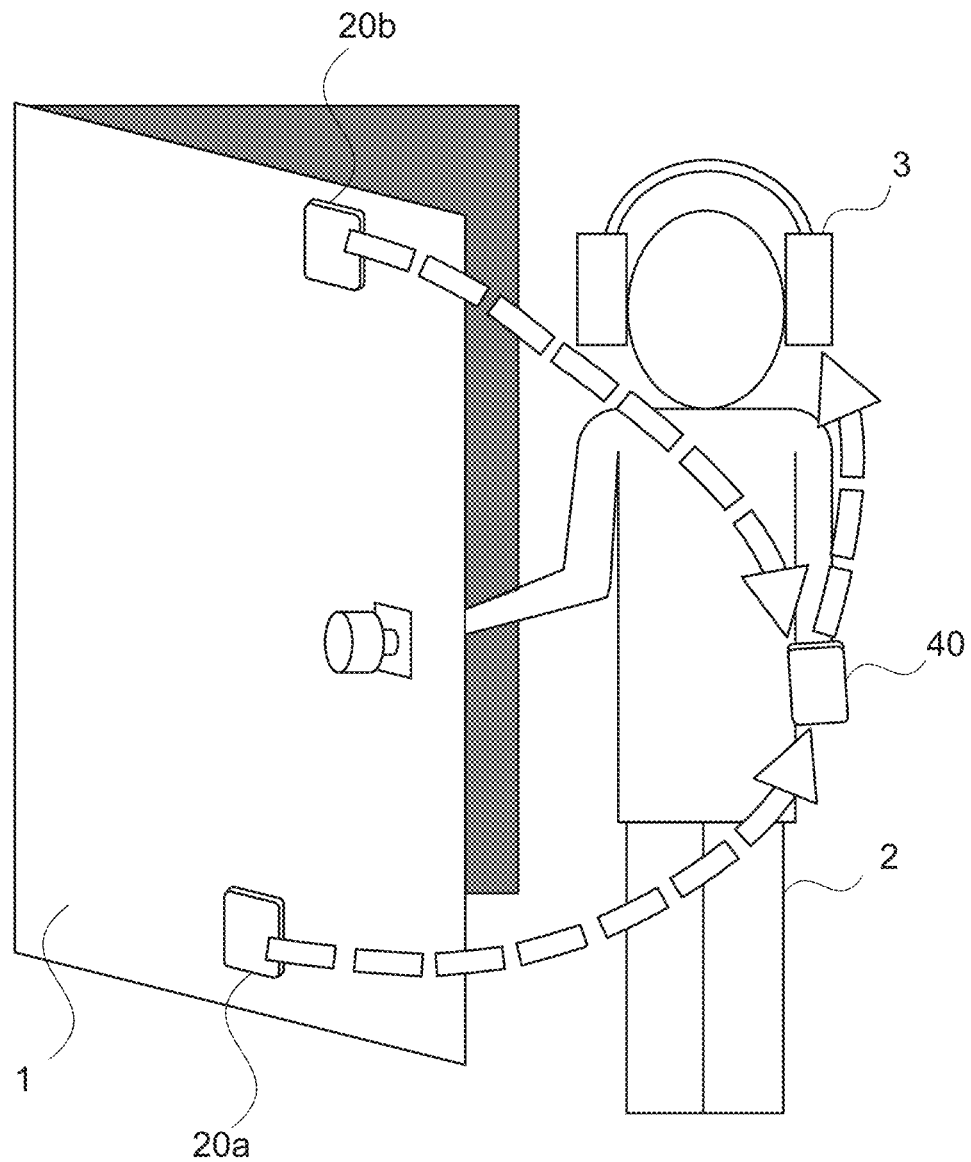
FIG. 8 A schematic diagram for describing the outline of the audio AR system according to this embodiment.

FIG. 8 is a schematic diagram for describing the outline of the audio AR system according to this embodiment. In this embodiment, a plurality of communication terminals 20a and 20b is installed in a door 1, which is a real object, as a sensor device. It should be noted that the configurations of sensor units 25 of the communication terminal 20a and the communication terminal 20b are not limited, and may be the same configurations or different configurations.

The configurations of the communication terminals 20a and 20b may be the same or different from each other. Alternatively, the method of detecting the motion of the door 1 is not limited, and any method may be employed. That is, the communication terminals 20a and 20b may be capable of detecting the motion of the door 1 by the same detection method. Alternatively, the communication terminals 20a and 20b may be capable of detecting the motion of the door 1 by different detection methods.

In this embodiment, sensor information (event ID) corresponding to the motion of the door 1 is generated from each of the communication terminals 20a and 20b and sent to the communication terminal 40 together with the time stamp.

The communication terminal 40 performs the reproduction control of the audio content illustrated in FIG. 5 with reference to earliest acquired event ID and time stamp. Accordingly, it is possible to provide a high-quality virtual experience according to the amount of delay.

It should be noted that the reproduction of the audio content may be performed after waiting for the sensor information (event ID) to arrive from both of the communication terminals 20a and 20b. In this case, the reproduction of the audio content is typically controlled with reference to latest acquired event ID and time stamp. In this case, there is a high possibility that the amount of delay (arrival time) is larger, but since the first reproduction method and the second reproduction method are selected as appropriate and the control of the audio content is performed, it is possible to suppress impairment of the virtual experience.

For example, in a case where the detection accuracy of the motion of the real object is prioritized, where the audio content corresponding to the motion of the real object does not include an attack sound, or the like, the reproduction control of the audio content is performed after waiting for the sensor information from all the sensor devices. By selecting the settings as appropriate in accordance with the condition or the like in this manner, it is possible to realize a high-quality virtual experience. Moreover, using the plurality of pieces of sensor information can detect the motion of the real object with high accuracy, and it can contribute to the improvement of the amount of delay even with sensors with low accuracy.

In this embodiment, the sensor information (event IDs) from both the communication terminals 20a and 20b corresponds to a plurality of pieces of sensor information generated on the basis of the motion of the real object. One or more pieces of sensor information that are references for the reproduction control are selected from among the plurality of pieces of reproduction information and the reproduction of the audio content is controlled on the basis of time information regarding acquisition of the selected one or more pieces of sensor information.

As described above, earliest acquired sensor information of the plurality of pieces of sensor information may be selected as the sensor information that is a reference for the reproduction control. Alternatively, all the pieces of sensor information may be selected as the sensor information that is the reference for the reproduction control.

Third Embodiment

Figure 9:
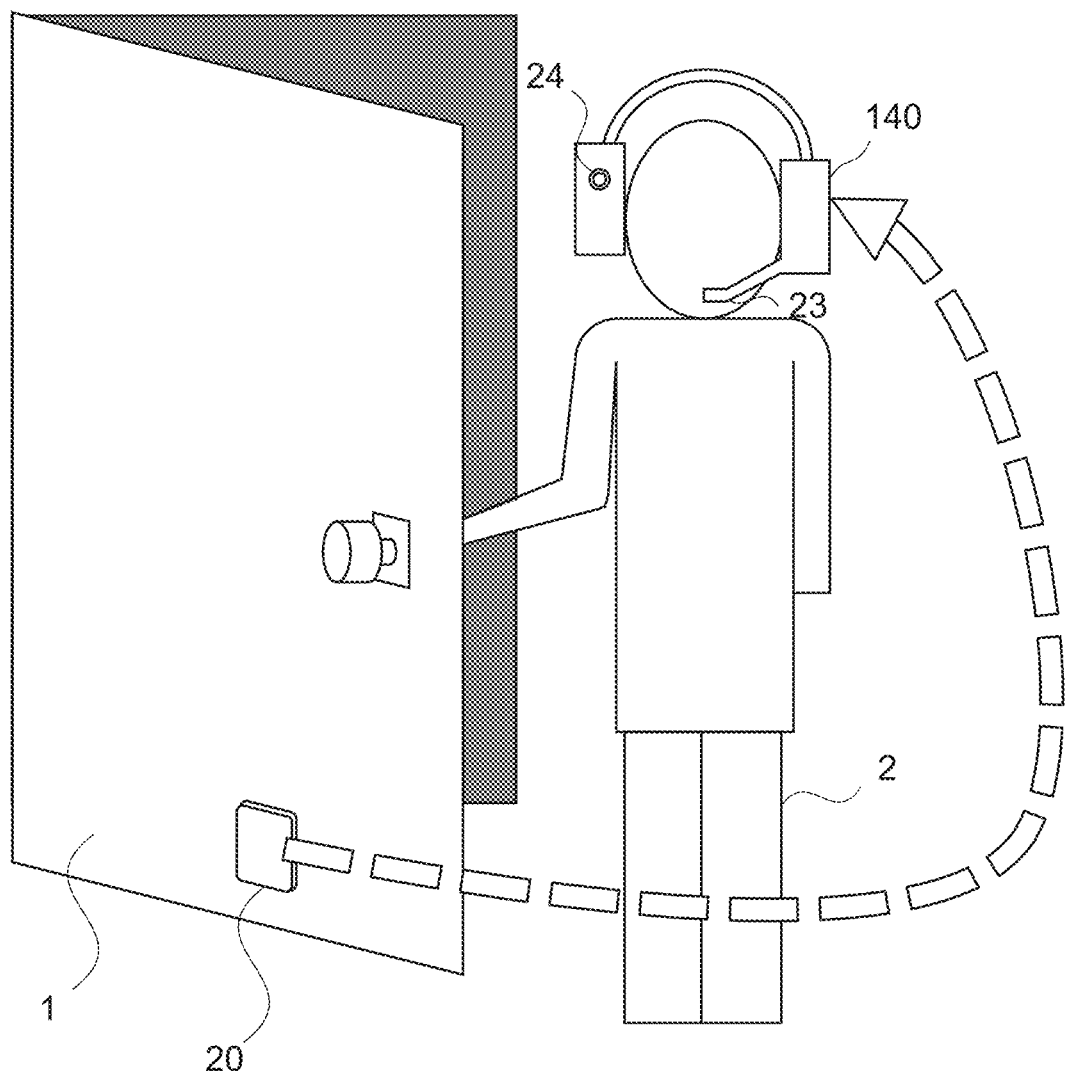
FIG. 9 A schematic diagram for describing the outline of an audio AR system according to a third embodiment of the present technology.

FIG. 9 is a schematic diagram for describing the outline of an audio AR system according to a third embodiment of the present technology. In this embodiment, headphones 140 provided with the function of the communication terminal 40 described in the first and second embodiments are used.

The headphones 140 have blocks of the communication terminal 40 shown in FIGS. 2 and 3. In FIG. 9, a microphone 23 and a camera 24 are shown. It should be noted that a speaker 22 is disposed in a portion to be mounted on the ear. Moreover, a controller 21, a sensor unit 25, or the like is provided at any position of the headphones 140.

For example, the communication terminal 20 installed in a door 1 and the headphones 140 worn by a user may cooperate with each other to perform reproduction control of an audio content corresponding to a motion of the door 1.

Figure 10:
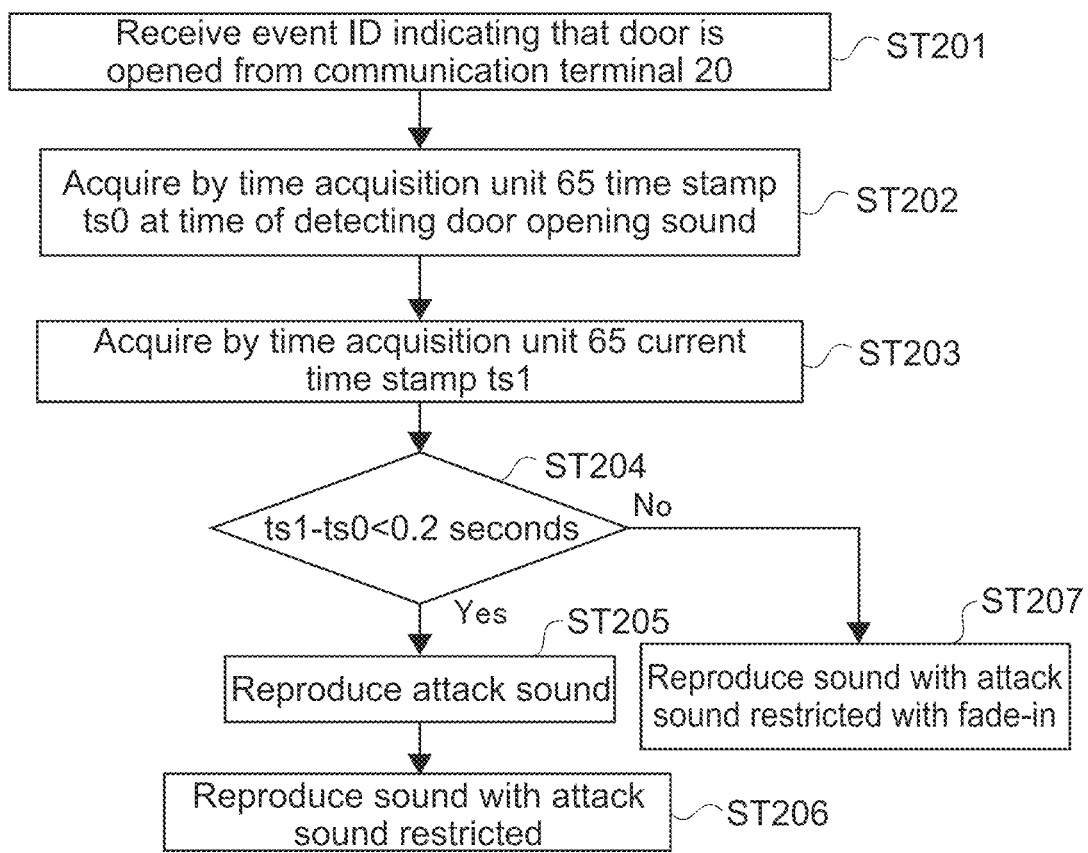
FIG. 10 A flowchart showing a control example of reproduction of the audio content by cooperation of a communication terminal and headphones.

FIG. 10 is a flowchart showing an example of the reproduction control of the audio content by cooperation of the communication terminal 20 and the headphones 140. First, an event ID associated with the motion of the door 1 is sent to the communication terminal 40 from the communication terminal 20.

The headphones 140 receive the event ID sent from the communication terminal 20 (Step 201). The headphones 140 acquires time information indicating when the microphone 23 detects a sound of the motion of the door 1 corresponding to the event ID.

For example, in a case where audio data detected by the microphone 23 is analyzed and the sound of the motion of the door 1 corresponding to the event ID is detected, a time stamp ts0 is acquired and stored. In Step 202, in a case where the event ID is received from the communication terminal 20, the time stamp ts0 at a time at which the sound of the motion of the door 1 corresponding to the event ID is detected is acquired.

For example, it is assumed that the event ID indicating that the door 1 is opened is sent from the communication terminal 20. On the headphones 140 side, the time stamp ts0 at a time at which the sound when the door 1 is opened is detected is stored. In Step 202, the stored time stamp ts0 is acquired.

The headphones 140 acquire the current time stamp ts1 (Step 203). Then, the reproduction of the audio content corresponding to the motion of the door 1 is controlled on the basis of an amount of delay between the time stamp ts0 at a time at which the sound of the motion of the door 1 corresponding to the event ID is detected and the current time stamp ts1 (Steps 204, 205, 206, and 207).

Thus, using the reception of the event ID from the communication terminal 20 installed in the real object as a trigger, a timing of detecting the sound of the motion of door 1 corresponding to the event ID and an amount of delay with respect to the current time may be calculated. The reproduction of the audio content may be controlled on the basis of the amount of delay.

In this case, the headphones 140 also function as a sensor device according to the present technology. Moreover, the audio data detected by the headphones 140 and the determination result that the sound is the sound of the motion of the door 1 corresponding to the event ID are included in sensor information generated on the basis of the motion of the real object. Then, the amount of delay between the timing of detecting the sound of the motion of door 1 corresponding to the event ID and the current time corresponds to the time information regarding the acquisition of the sensor information.

It should be noted that it is also possible to recognize the motion of the door 1 and recognize the reproduction of the audio content on the basis of the audio data detected by the microphone 23. On the other hand, using the reception of the event ID from the communication terminal 20 installed in the real object as the trigger as in this embodiment improves the recognition accuracy of the motion of the door 1 and enables the reproduction control of the audio content according to the amount of delay to be performed. As a result, a high-quality virtual experience can be realized.

It should be noted that the cooperative processing with the communication terminal 20 may be performed using not only the audio data detected by the microphone 23 of the headphones 140 but also the captured image captured by the camera 24 of the headphones 140. That is, the detection of the motion of the door 1 corresponding to the received event ID may be performed using the captured image and the amount of delay with respect to the current time may be calculated.

Fourth Embodiment

Figure 11:
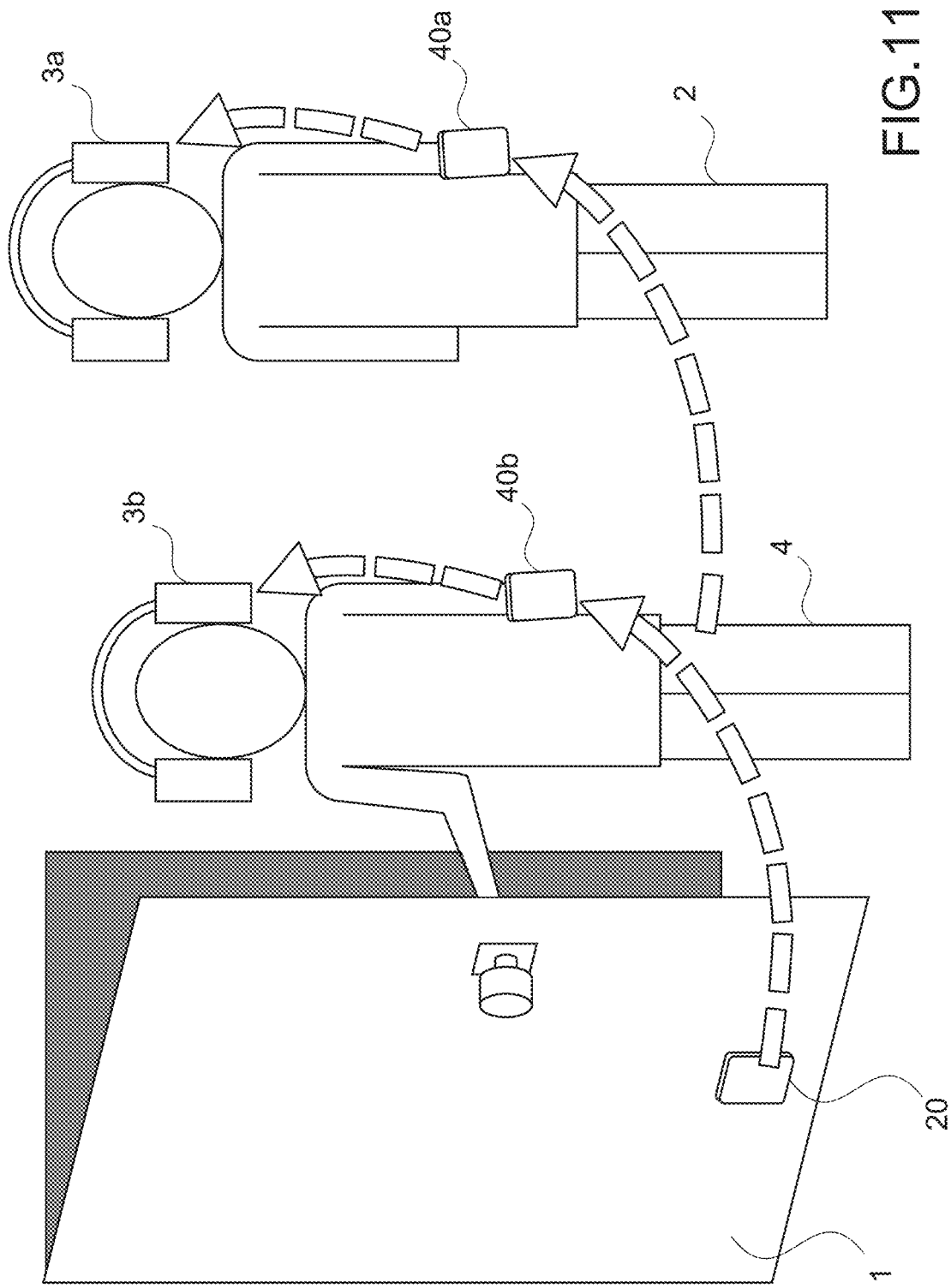
FIG. 11 A schematic diagram for describing the outline of an audio AR system according to a fourth embodiment.

FIG. 11 is a schematic diagram for describing the outline of an audio AR system according to a fourth embodiment.

In the first to third embodiments, the reproduction of the audio content is controlled on the basis of the amount of delay of the sensor information. Additionally or alternatively, the reproduction control of the audio content based on various conditions may be performed.

For example, in this embodiment, a case where a person other than the user performs an operation on the real object such as the door or an example in which the control of the reproduction of the audio content is performed on the basis of the degree of interest of the user with respect to the real object.

As shown in FIG. 11, it is assumed that a user 2 and a user 4 are located in the vicinity of a door 1. From the point of view of user 2, the user 4 corresponds to another person. From the point of view of the user 4, the user 2 corresponds to another person. An example in which the user 4 opens the door 1 will be shown.

When the user 4 opens the door 1, a sensor unit 25 of a communication terminal 20 senses the motion of the door 1. A motion recognition unit 34 recognizes an event in which the door 1 is opened on the basis of the sensing result. A communication control unit 36 sends an event ID associated with the recognized motion of the door 1 and a time stamp to a communication terminal 40a of the user 2 and a communication terminal 40b of the user 4. It should be noted that the configurations of the communication terminal 40b of the user 2 and the communication terminal 40a of the user 4 are not limited, and may be the same or different from each other. As a matter of course, the same devices may be used as the communication terminals 40a and 40b.

In this embodiment, a user determination unit 67 of the communication terminal 40a of the user 2 determines whether or not the door 1 is operated by the user 2. Similarly, a user determination unit 67 of the communication terminal 40b of the user 4 determines whether or not the door 1 is operated by the user 4. For example, each user determination unit 67 determines whether or not the door 1 is operated by the user 2 (4) on the basis of a distance between the user 2 (4) and the door 1.

In the communication terminal 40b of the user 4, it is determined that the door 1 is operated by the user 4. In this case, for example, the processing shown in FIG. 5 is performed to realize an audio AR.

In the communication terminal 40a of the user 2, it is determined that the door 1 is not operated by the user 2. That is, it is determined that the door 1 is operated by another person. In this case, the reproduction of the attack sound is restricted regardless of the amount of delay of the sensor information (event ID). Alternatively, the volume of the audio content is sufficiently reduced. Alternatively, the reproduction itself of the audio content may be restricted (e.g., stopping the reproduction of the content, limiting the volume, and the like are included).

For example, a first reproduction method and a second reproduction method which are selectively performed on the basis of the amount of delay may be performed. That is, in a case where it is determined that the door 1 is operated by the user of the communication terminal, the reproduction of the audio content corresponding to the motion of the door 1 is controlled by the first reproduction method. In a case where it is determined that the door 1 is operated by another person, the reproduction of the audio content corresponding to the motion of the door 1 is controlled by the second reproduction method. Such processing may be performed.

As described above, the reproduction control of the audio content corresponding to a difference in distance between the real object and the user is performed, and thus the user can focus on and experience the event occurring near the user more realistically. Moreover, the communication contents as to distant events can be reduced, and thus the number of systems required for use in the audio AR system 100 can be reduced.

It should be noted that the determination method of the user determination unit 67 is not limited. For example, also in a case where an image in which the door 1 is operated by the user 4 is captured by the camera 24, it may be determined that an operation on the real object is performed by a person other than the user 2. Alternatively, for example, it may be determined on the basis of a sensor value acquired by the sensor unit 25 such as acceleration of the door 1.

Moreover, the control of the reproduction of the audio content by the reproduction control unit 57 is also not limited. For example, in a case where the operation on the real object is performed by a person other than the user 2, the reproduction of the audio content may be restricted.

The present technology is not limited to the case where the distance between the real object and the user is used for the determination of the person who operates the door 1. The reproduction control of the audio content may be performed on the basis of the distance itself between the real object and the user. For example, the reproduction of the audio content may be controlled on the basis of whether or not the distance from the real object is within a certain range, whether or not the distance is within a predetermined range close to the real object, whether or not the distance is within a predetermined range far away from the real object, or the like. Accordingly, various virtual experiences can be realized, and the user can be enjoyed.

Next, a description will be given in which the user 2 controls the reproduction of the audio content on the basis of the degree of interest with respect to the door 1.

The degree-of-interest determination unit 66 determines how much degree of interest the user 2 has with respect to the door 1 on the basis of the detection information acquired by the microphone 23, the camera 24, and the sensor unit 25.

Examples of the method of determining the degree of interest include whether the user 2 is operating the door 1, whether the user 4 operating the door 1 is in a group relationship with the user 2, whether the user 2 has already experienced the audio content output when operating the door 1, whether the user 2 is looking at the door 1, whether the user 2 faces the direction of the door 1 near the door 1, and the like.

The group relationship may include at least one of whether the user 4 belongs to the same group as the user 2, whether the user is a family of the user 4, whether the user is a friend of the user 4, or whether the user is a friend of user 4 on a social networking-service (SNS). As a matter of course, the present technology is not limited thereto, and group relationship may be set on the basis of relationships with various users 2.

The reproduction control unit 57 controls the reproduction of the audio content on the basis of a determination result of the degree-of-interest determination unit 66. For example, the reproduction control unit 57 reproduces an attack sound in a case where the degree of interest of the user 2 with respect to the door 1 is high, for example, in a case where the user 2 sees the user 4, who is a friend of the user 2, operating the door 1. Otherwise, in a case where the degree of interest of the user 2 with respect to the door 1 is low, the reproduction control unit 57 reproduces a sound with the attack sound restricted.

For example, in a case where the degree of interest of the user 2 is high, reproduction control similar to that when the user 2 is making an operation is performed even when another person is making an operation. On the other hand, in a case where the degree of interest of the user 2 is low, reproduction control similar to that when another person is making an operation is performed even when the user 2 is making an operation. For example, when the user 2 opens the door 1 while watching another direction or talking with another person, it is determined that the degree of interest of the user is low, and the reproduction of the attack sound is restricted. Or the reproduction of the audio content itself is restricted.

It should be noted that the method of determining the degree of interest is not limited. For example, the degree of interest may be determined on the basis of moving or stopping of the user 2. Alternatively, for example, when the user 2 is listening to various sounds such as music or other audio content is output from the speaker 22, the reproduction of the audio content corresponding to the motion of the door 1 may be restricted.

Moreover, the present technology is not limited to the control of the reproduction of the audio content based on the degree of interest. For example, a numeric value may be associated with each degree of interest to control the reproduction of the audio content in a case where a threshold value is exceeded. Alternatively, for example, a plurality of methods of measuring the degree of interest may be performed in any combination.

That is, when the user 4 operates the door 1, the sound with the attack sound restricted is reproduced in the fourth embodiment. Even in this instance, in a case where it is determined that the user 2 has a high degree of interest with respect to the door 1, the reproduction control unit 57 may reproduce the attack sound. For example, in a case where the user 4 operating the door 1 and the user 2 are not in the group relationship, the user 2 is gazing at the door 1 near the door 1, and the user 2 has not experienced the audio content output when operating the door 1, the reproduction control unit 57 may reproduce the attack sound.

Alternatively, for example, the reproduction control unit 57 may reproduce the attack sound in a case where the degree of interest of the user 2 with respect to the door 1 is low.

Figure 12:
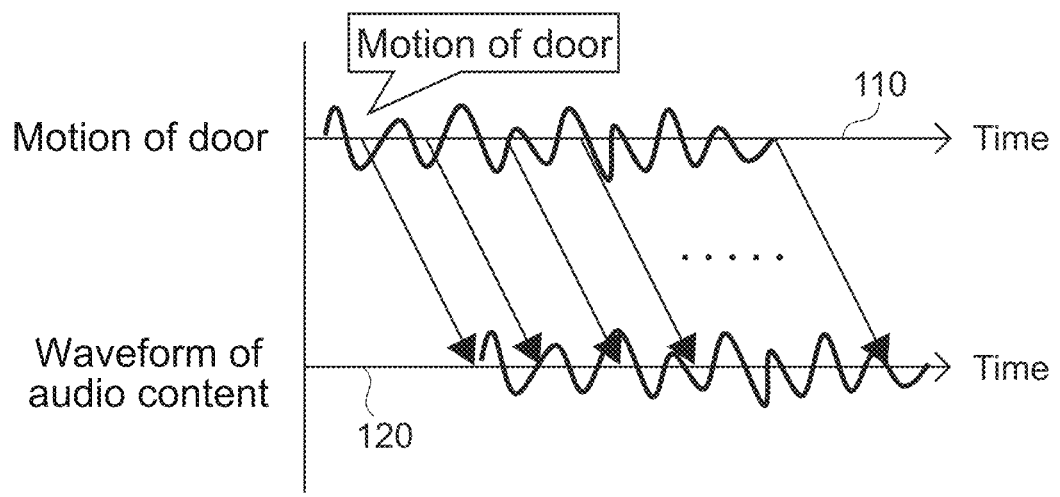
FIG. 12 A schematic diagram showing control in which sensor information is restricted on the basis of a degree of interest.
Figure 12:
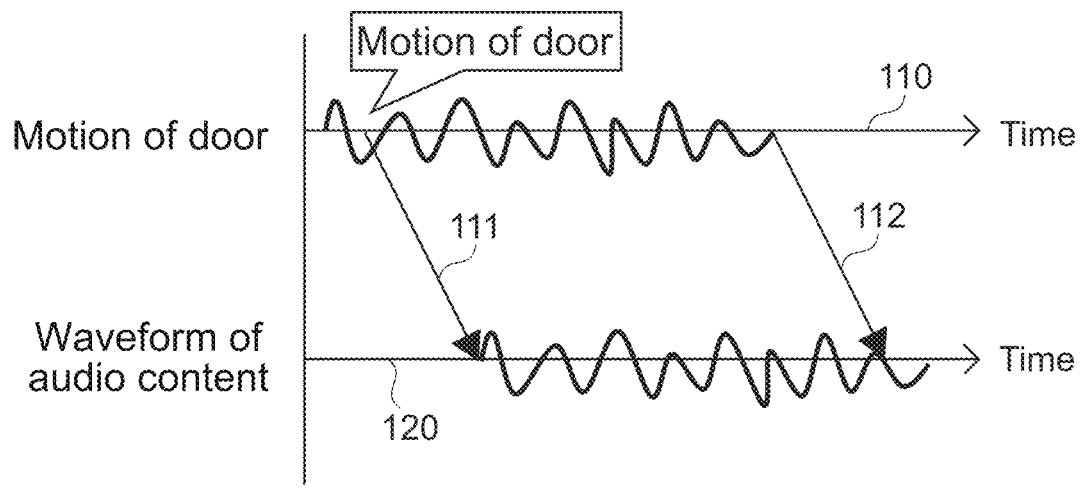

FIG. 12 is a schematic diagram showing control in which the sensor information is restricted on the basis of the degree of interest.

A straight line 110 indicates a sensor value, such as acceleration, with respect to the motion of the door, and the time elapses in the arrow direction. A straight line 120 indicates a waveform of the audio content output from the communication terminal 40 and the time elapses in the arrow direction.

The motion of the door 1 acquired by the sensor unit 25 is sent to the communication terminal 40. The communication terminal 40 controls the reproduction of the audio content on the basis of the sent motion of the door 1.

As shown in FIG. 12A, the motion of the door 1 is frequently sent at short intervals, such that the user 2 can more specifically listen to the audio content related to the motion of the door 1. For example, when the door 1 is forcibly opened or the door 1 is slowly opened, the reproduction control unit 57 controls the audio content in accordance with the acceleration of the door 1. Accordingly, the user 2 can experience a high-quality virtual experience.

In the fourth embodiment, the amount of information of the sensor information generated on the basis of the motion of the door 1 sent from the sensor unit 25 is restricted on the basis of the degree of interest of the user 2 with respect to the door 1.

As shown in FIG. 12A, in a case where the degree-of-interest determination unit 66 determines that the degree of interest of the user 2 with respect to the door 1 is high, the communication control unit 54 receives the information amount of the sensor information acquired by the sensor unit 25 without restriction.

Moreover, as shown in FIG. 12B, in a case where the degree-of-interest determination unit 66 determines that the degree of interest of the user 2 with respect to the door 1 is low, the communication control unit 54 restricts the information amount of the sensor information acquired by the sensor unit 25. As a specific example of the restriction of the amount of information of the sensor information, the communication control unit 54 receives only first sensor information 111 when the door 1 opens and last sensor information 112 when the motion of the door 1 stops.

In a case where it is determined that the degree of interest of the user 2 with respect to the door 1 is low, the communication control unit 36 that is the sender may restrict the amount of information of the sensor information to be sent. As a matter of course, the amount of information of the sensor information may be restricted at both the sender and the receiver.

It should be noted that the method of restricting the amount of information of the sensor information is not limited. For example, the amount of information may be restricted on the basis of communication environments of the communication terminal 20 and the communication terminal 40. Alternatively, for example, in a case where the user 2 has a high degree of interest with respect to the door 1, more sensor information may be sent.

When the sensor information of the motion of the door is frequently sent, the communication and processing resources are required because the realistic sound expression corresponding to the motion of the real object becomes possible. For example, in a case where there are a plurality of real objects other than the door on which the communication terminal 20 is disposed, the amount of delay can be larger if their sensor information is frequently sent.

Therefore, in the fourth embodiment, the degree of interest of the user is determined, such that the sensor information is frequently sent only when the user is viewing or operating the real object and the frequency of sending the sensor information when the user is not viewing the real object is reduced. Accordingly, a high-quality virtual experience can be experienced by reducing the amount of delay.

Moreover, by reproducing only the sound when the user actively operates the real object as a so-called noticeable sound (attack sound) such as a high-tone sound, a large-volume sound, a sound having the amplitude that greatly changes per unit time, or the like, the sound on which the user wishes to focus is reproduced in a most noticeable manner even in a crowded environment where many other users are present. Moreover, the attack sound of the real object which is operated by another person and with respect to which the degree of interest of the user is low is restricted. Accordingly, it is possible to concentrate on the user's experience because the operation sound of the other user is unnoticeable. Moreover, in a situation where various events occur around the user, it is possible to listen to a sound related to a most interesting event and it is possible to further concentrate on the important experience.

Other Embodiments

The present technology is not limited to the above-mentioned embodiments, and various other embodiments can be realized.

In the first to fourth embodiments described above, the real object on which the communication terminal 20 is installed is the door 1. The present technology is not limited thereto, and the real object may be an object existing in the real space operated by the user 2. Examples of the real object include chairs, bags, cars, switches, pens, and the like. Alternatively, for example, the real object may be an object that cannot be operated by the user. For example, the present technology can also be applied to a liquid crystal display or the like that displays an advertisement of a station. Moreover, the operation of the user 2 on the real object can also be said to be a motion of the user 2.

In the first to fourth embodiments described above, the control of the reproduction of the audio content is controlled on the basis of the amount of delay, the degree of interest, and the like. The control of the reproduction of the audio content is not limited thereto, and the reproduction of the audio content may be controlled on the basis of the environment around the user 2 or the surrounding environmental sound. For example, the reproduction of the audio content may be controlled on the basis of the density of people, illumination brightness, radio traffic conditions, the presence or absence of a friend, and the like. Alternatively, the reproduction of the audio content may be controlled on the basis of whether or not the surrounding environmental sound is annoying or quiet (the volume of the environmental sound is high or low), whether or not the sound similar to the audio content is flowing, whether or not the user him or herself is talking, and the like. Alternatively, the reproduction of the audio content may be controlled on the basis of whether or not the user concentrates on other content, whether or not the user is viewing a video through a smartphone or the like, and the like. Alternatively, for example, the reproduction of the audio content may be controlled on the basis of the number of times the user 2 operates the door 1.

Moreover, in the first to fourth embodiments described above, the control of the reproduction of the audio content is performed on the basis of the order in which the events arrive. The order of arrival of the event IDs may be synchronized without limitation. For example, when the event ID indicating the sound of the bullet landing on the wall reaches, the reproduction of the audio content may be restricted until the event ID indicating the sound of the launch of the bullet reaches. Accordingly, it is possible to prevent the virtual experience of the user from being compromised by properly controlling the order of the audio content to be reproduced.

Figure 13:
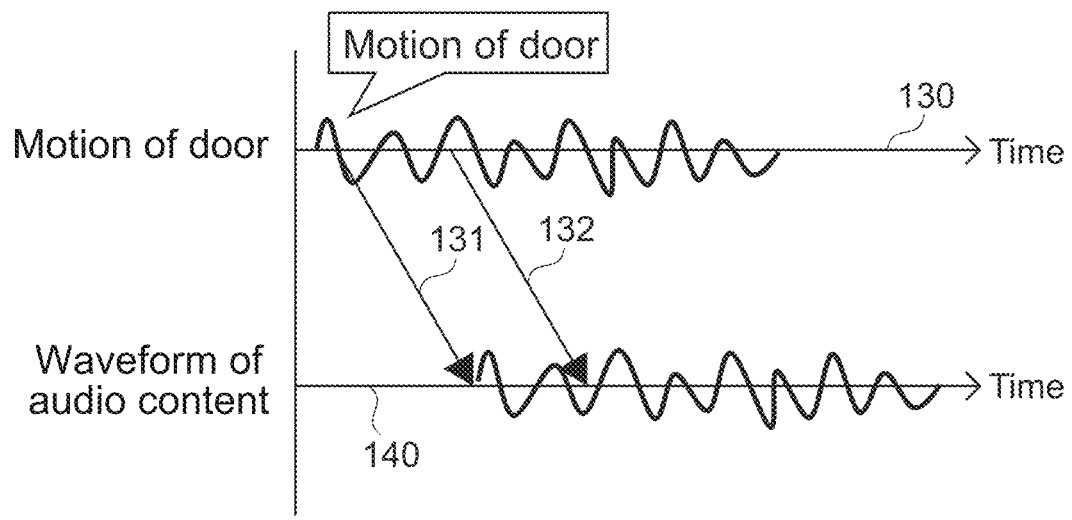
FIG. 13 A schematic diagram showing communication control of sensor information according to another embodiment.
Figure 13:
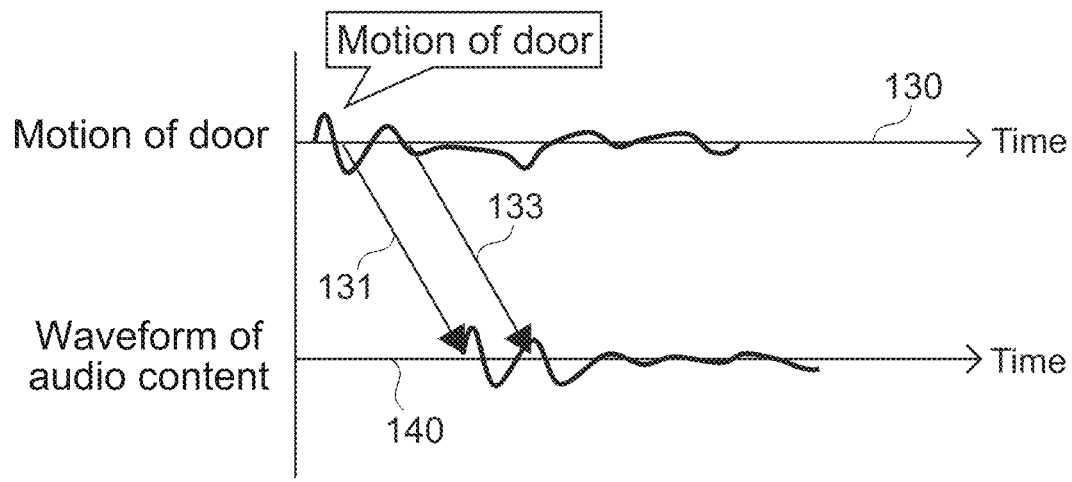

FIG. 13 is a schematic diagram showing communication control of sensor information according to another embodiment. As shown in FIG. 13, the line 130 shows the time axis of the waveform showing the sensor value such as acceleration with respect to the motion of the door 1 has elapsed time in the arrow direction. The straight line 140 indicates a time axis of a waveform indicating a waveform of the audio content output from the communication terminal 40 with time elapsed in the arrow direction.

In the first to fourth embodiments described above, the audio content is reproduced by sending the sensor information generated on the basis of the opening motion of the door 1 to the communication terminal 40. The present technology is not limited thereto, the sensor information generated on the basis of the opening motion of the door 1 may be sent separately in stages.

FIG. 13A is a schematic diagram showing reproduction of the audio content on the basis of the sensor information from the communication terminal 20.

As shown in FIG. 13A, the communication terminal 20 senses the motion of the door. At this time the communication control unit 36 sends sensor information 131 indicating that the door starts to move to the communication control unit 54 of the communication terminal 40. The reproduction control unit 57 controls the reproduction of the audio content corresponding to the motion in which the door starts to move.

Next, when the door is further opened, the communication control unit 36 sends to the communication control unit 54 sensor information 132 indicating that the door is moving. The reproduction control unit 57 controls the reproduction of the audio content corresponding to the motion in which the door is moving.

That is, the reproduction control unit 57 starts reproduction of the audio content in response to acquisition of the sensor information and determines whether or not the reproduction of the audio content is to be continued on the basis of whether or not information regarding continuation of the reproduction of the audio content is acquired. It should be noted that in this embodiment, the sensor information 131, 132, and 133 corresponds to information regarding continuation of the reproduction of the audio content.

In order for the reproduction control unit 57 to control the reproduction of the audio content corresponding to the motion of the door, it is necessary to store sensor information indicating the motion in which the door is opened for several milliseconds. However, since the reproduction control unit 57 controls the reproduction of the audio content on the basis of the amount of delay of the communication as shown in the above-mentioned embodiments, the amount of delay can be larger when the sensor information is stored for several milliseconds.

Since the sensor information is sent stepwise as in this embodiment, it is possible to reduce the amount of delay until it can be recognized that the real object has moved. Accordingly, a high-quality virtual experience can be experienced.

FIG. 13B is a schematic diagram showing the stop of the reproduction of the audio content on the basis of the sensor information from the communication terminal 20.

As shown in FIG. 13B, the communication terminal 20 senses the motion of the door and the communication control unit 36 sends to the communication control unit 54 of the communication terminal 40 the sensor information 131 indicating that the door starts to move. The reproduction control unit 57 controls the reproduction of the audio content corresponding to the motion in which the door starts to move.

Next, when the motion of the door stops, the communication control unit 36 sends to the communication control unit 54 sensor information 133 indicating that the door stops. The reproduction control unit 57 controls the reproduction of the audio content on the basis of the sensor information indicating that the door stops. For example, the reproduction control unit 57 stops the reproduction of the audio content by fading out the sound "CLICK" reproduced when the door starts to move.

That is, in FIG. 13B, the control is performed to stop the reproduction of the audio content when the motion of the door is stopped after the audio content corresponding to the motion in which the door is opened is reproduced. As a result, it is possible to prevent the reproduction of the audio content corresponding to the user's unintended motion of the real object.

FIG. 14 is a diagram showing examples of audio content depending on various scenes.

In the first to fourth embodiments described above, the sound generated when moving the real object such as the door is set as the virtual sound. The present technology is not limited thereto, and virtual sounds may be set depending on various scenes.

As an example, audio content associated with a place or space may be reproduced. For example, when the user approaches a place where a picture of a bird or a river is decorated, a bird song or a river sound may be reproduced. Alternatively, for example, a raindrop sound may be reproduced when a user is viewing a raining space (video).

As one example, audio content that varies depending on the user's motion may be reproduced. For example, the audio content may be reproduced such that the footsteps sound change depending on running or walking of the user.

As one example, audio content that varies with the motion of another user may be reproduced. For example, the footsteps sound may be reproduced when other users are walking nearby.

As one example, audio content that varies depending on the motion of the real object in the real space may be reproduced. For example, in an event or the like in which a game experience can be obtained in the real world, a sound at a time of opening a treasure box in the real space may be reproduced only to the user using the communication terminal 40. In addition, various types of audio content may be reproduced by operating a window, a switch, a remote controller, and the like.

As an example, audio content that changes with virtual events in the scenario may be reproduced. For example, in a case where a virtual object simulating a ghost appears in the user's field of view, a shout of the virtual ghost may be reproduced.

As a matter of course, the present technology is not limited thereto, and various scenes may be assumed. For example, in a case where the vehicle is running on a road when it is not raining, audio content providing a sound as if the vehicle were running on the raining road may be reproduced through an in-vehicle speaker.

In the first to fourth embodiments described above, the reproduction of the audio content corresponding to the motion of the real object is controlled. The present technology is not limited thereto, and the communication terminal 40, a dedicated device, or the like may vibrate.

In the first to fourth embodiments described above, the sensor information generated on the basis of the motion of the real object is sent from the communication terminal 20. The present technology is not limited thereto, and a control signal for reproducing the audio content may be sent from the communication terminal 20.

In the first to fourth embodiments described above, the reproduction of the audio content is controlled by the first and second reproduction methods in a case where the sound is generated immediately in response to the motion of the real object when the door 1 opens, for example. The present technology is not limited thereto, and the control of the reproduction of the audio content may also be performed on sounds generated slightly behind the motion of the real object. For example, when an open door closes, audio content may be reproduced earlier than the door closes on the basis of an amount of delay.

Moreover, in the first to fourth embodiments described above, the amount of delay is calculated on the basis of the time difference between the acquired time stamps. The present technology is not limited thereto, and amount-of-delay information itself may be acquired instead of the time stamps.

In the first to fourth embodiments described above, the audio content is reproduced to all the users who have the communication terminal 40. The present technology is not limited thereto, and the audio content may be output through the speaker 22 such that the sound can be heard only to some of the users having the communication terminal 40. For example, the sound may be reproduced only through speakers 22 of specific users who needs a voice instruction of a ticket vending machine, an information guide board, or the like of a station.

In the first to fourth embodiments described above, the reproduction of the audio content is controlled in accordance with the degree of interest of the user with respect to the real object. The present technology is not limited thereto, and the volume of the audio content may be controlled in accordance with the surrounding environment, the distance from the other user or real object, and the like. For example, the reproduction of the audio content of the motion of the real object by operations performed by tenth and subsequent other users may be restricted.

In the first to fourth embodiments described above, the reproduction of the audio content is controlled on the basis of the amount of delay. The present technology is not limited thereto, and in a case where the delay on the communication terminal 40 side is large, the audio content to be output may be controlled to be a light file. For example, in a case where the delay is large, a light fixed file such as RIFF waveform audio format (WAVE) may be used. Alternatively, for example, in a case where the delay is small, a real-time speech synthesized file may be used.

In the first to fourth embodiments described above, the sound with the attack sound restricted is reproduced as the method of restricting the attack sound. The present technology is not limited thereto, and various methods of restricting the attack sound may be employed. For example, the attack sound may be obscured such that the user is hard to perceive it by fading in the attack sound part of the audio content. Alternatively, when the attack sound is reproduced, another sound such as a crowd sound may be overlapped.

Cooperation of a computer installed in the communication terminal and another computer capable of communicating therewith via a network or the like or another computer capable of communicating with the HMD may perform the information processing method and the program according to the present technology and may construct the information processing apparatus according to the present technology.

That is, the information processing method and the program according to the present technology can be executed not only in a computer system configured by a single computer but also in a computer system in which a plurality of computers cooperate each other. It should be noted that in the present disclosure, the system means a set of components (such as apparatuses and modules (parts)) and it does not matter whether all of the components are in a single casing. Therefore, a plurality of apparatuses housed in separate casings and connected to one another via a network and a single apparatus having a plurality of modules housed in a single casing are both the system.

Execution of the information processing method and the program according to the present technology by the computer system includes, for example, both a case where the recognition of the event, the calculation of the amount of delay, and the control on the reproduction of the audio content, and the like are performed by a single computer and a case where the respective processes are performed by different computers. Further, performing the respective processes by a predetermined computer includes causing another computer to perform some or all of those processes and obtaining results thereof.

That is, the information processing method and the program according to the present technology can also be applied to a cloud computing configuration in which a single function is shared and commonly processed by a plurality of apparatuses via a network.

The respective configurations such as the information processing unit, the event recognition unit, the delay calculation unit, and the reproduction control unit, the control flow of the communication system, and the like, which have been described above with reference to the drawings are merely one embodiment, and can be arbitrarily modified without departing from the gist of the present technology. That is, any other configurations, algorithms, and the like for carrying out the present technology may be employed.

It should be noted that the effects described in the present disclosure are merely illustrative, not limitative, and other effects may be provided. The above description of the plurality of effects does not mean that those effects are always provided at the same time. It means that at least any of the above-mentioned effects can be obtained in a manner that depends on conditions and the like and effects not described in the present disclosure can be provided as a matter of course.

At least two of the features in the respective embodiments described above may be combined. In other words, various features described in the respective embodiments may be arbitrarily combined across the embodiments. Further, the various effects described above are merely illustrative, not limitative, and other effects may be provided.

It should be noted that the present technology can also take the following configurations.

(1) An information processing apparatus, including
    a reproduction control unit that controls, on the basis of time information regarding acquisition of sensor information generated on the basis of a motion of a real object, reproduction of audio content corresponding to the motion of the real object by a first reproduction method in a case where the time information is within a predetermined time range and controls the reproduction of the audio content by a second reproduction method in a case where the time information is out of the predetermined time range.

(2) The information processing apparatus according to (1), in which
    the time information is generated on the basis of the motion of the real object and sent to the information processing apparatus by a sensor device.

(3) The information processing apparatus according to (2), in which
    the time information is an arrival time from a time at which the sensor information is generated or a time at which the sensor information is sent to the information processing apparatus to a time at which the sensor information is acquired.

(4) The information processing apparatus according to any one of (1) to (3), in which
    the first reproduction method includes reproduction of an attack sound according to the motion of the real object, and
    the second reproduction method restricts reproduction of the attack sound.

(5) The information processing apparatus according to any one of (1) to (4), in which
    the second reproduction method includes at least one of fade-in of the audio content or fade-out of the audio content.

(6) The information processing apparatus according to any one of (1) to (5), further including
    a first determination unit that determines whether or not the real object is operated by a user, in which the reproduction control unit controls the reproduction of the audio content on the basis of a determination result of the first determination unit.

(7) The information processing apparatus according to (6), further including
an acquisition unit capable of acquiring detection information including at least one of information regarding a state of the user or information regarding a surrounding state, in which
the first determination unit performs the determination on the basis of the acquired detection information.

(8) The information processing apparatus according to (6) or (7), in which
the first determination unit performs the determination on the basis of a distance between the real object and the user.

(9) The information processing apparatus according to any one of (6) to (8), in which
the first determination unit performs the determination on the basis of a motion of the user.

(10) The information processing apparatus according to any one of (1) to (9), further including
a second determination unit that determines a degree of interest of the user about the real object, in which
the reproduction control unit controls the reproduction of the audio content on the basis of a determination result of the second determination unit.

(11) The information processing apparatus according to (10), further including
an acquisition unit capable of acquiring the detection information including at least one of information regarding a state of the user or information regarding a surrounding state, in which
the second determination unit performs the determination on the basis of the acquired detection information.

(12) The information processing apparatus according to any one of (1) to (11), further including
an acquisition unit capable of acquiring the detection information including at least one of information regarding a state of the user or information regarding a surrounding state, in which
the reproduction control unit controls the reproduction of the audio content on the basis of the acquired detection information.

(13) The information processing apparatus according to (12), in which
the reproduction control unit controls the reproduction of the audio content on the basis of a surrounding environmental sound.

(14) The information processing apparatus according to (12) or (13), in which
the reproduction control unit controls the reproduction of the audio content on the basis of the number of operations of the user on the real object.

(15) The information processing apparatus according to any one of (1) to (14), in which
the reproduction control unit selects one or more pieces of sensor information that are references for reproduction control of a plurality of pieces of sensor information generated on the basis of the motion of the real object and controls time information regarding acquisition of the selected one or more pieces of sensor information on the basis of the reproduction of the audio content.

(16) The information processing apparatus according to (15), in which
the reproduction control unit selects earliest acquired sensor information of the plurality of pieces of sensor information as one or more pieces of sensor information that are references for the reproduction control.

(17) The information processing apparatus according to any one of (1) to (16), in which
the reproduction control unit starts the reproduction of the audio content in response to the acquisition of the sensor information and determines whether or not to continue the reproduction of the audio content on the basis of whether or not information regarding continuation of the reproduction of the audio content has been acquired.

(18) The information processing apparatus according to any one of (1) to (17), in which
the reproduction control unit controls the reproduction of the audio content on the basis of whether or not other audio content different from the audio content corresponding to the motion of the real object is reproduced.

(19) An information processing method, including
by a computer system
controlling, on the basis of time information regarding acquisition of sensor information generated on the basis of a motion of a real object, reproduction of audio content corresponding to the motion of the real object by a first reproduction method in a case where the time information is within a predetermined time range and controls the reproduction of the audio content by a second reproduction method in a case where the time information is out of the predetermined time range.

(20) A recording medium on which a program is recorded that causes a computer to execute
a step of controlling, on the basis of time information regarding acquisition of sensor information generated on the basis of a motion of a real object, reproduction of audio content corresponding to the motion of the real object by a first reproduction method in a case where the time information is within a predetermined time range and controls the reproduction of the audio content by a second reproduction method in a case where the time information is out of the predetermined time range.

(21) The information processing apparatus according to any one of (1) to (18) that controls the reproduction of the audio content by open-air headphones.

(22) The information processing apparatus according to any one of (1) to (18) and (21) that is configured as open-air headphones.

(23) The information processing apparatus according to any one of (1) to (18), further comprising
headphones that output the audio content, and
being configured as a head-mounted display (HMD).

REFERENCE SIGNS LIST 20 communication terminal
21 controller
34 motion recognition unit
35 time acquisition unit
40 communication terminal
56 delay calculation unit
57 reproduction control unit
61 user state detection unit
62 state detection unit
63 event recognition unit
65 time acquisition unit
66 degree-of-interest determination unit
67 user determination unit

The invention claimed is:

1. An information processing apparatus, comprising
a delay calculation unit configured to calculate an amount of delay between a time at which a motion sensor generates sensor information on a basis of a motion of a real object and a time at which the sensor information is acquired by the information processing apparatus, and
a reproduction control unit configured to select, on a basis of whether the amount of delay is within a predetermined time range, between control of a speaker to reproduce audio content by a first reproduction method and control of the speaker to reproduce the audio content by a second reproduction method,
wherein the delay calculation unit and the reproduction control unit are each implemented via at least one processor.

2. The information processing apparatus according to claim 1, wherein
the sensor information is sent to the information processing apparatus by the motion sensor.

3. The information processing apparatus according to claim 1, wherein
the first reproduction method includes reproduction of an attack sound according to the motion of the real object, and
the second reproduction method restricts reproduction of the attack sound.

4. The information processing apparatus according to claim 1, wherein
the second reproduction method includes at least one of fade-in of the audio content or fade-out of the audio content.

5. The information processing apparatus according to claim 1, further comprising
a first determination unit configured to determine whether or not the real object is operated by a user, wherein
the reproduction control unit is further configured to control the reproduction of the audio content on a basis of a determination result of the first determination unit, and
the first determination unit is implemented via at least one processor.

6. The information processing apparatus according to claim 5, further comprising
an acquisition unit configured to acquire detection information including at least one of information regarding a state of the user or information regarding a surrounding state, wherein
the first determination unit is further configured to perform the determination on a basis of the acquired detection information, and
the acquisition unit is implemented via at least one processor.

7. The information processing apparatus according to claim 5, wherein
the first determination unit is further configured to perform the determination on a basis of a distance between the real object and the user.

8. The information processing apparatus according to claim 5, wherein
the first determination unit is further configured to perform the determination on a basis of a motion of the user.

9. The information processing apparatus according to claim 1, further comprising a second determination unit configured to determine a degree of interest of a user about the real object, wherein
the reproduction control unit is further configured to control the reproduction of the audio content on a basis of a determination result of the second determination unit, and
the second determination unit is implemented via at least one processor.

10. The information processing apparatus according to claim 9, further comprising
an acquisition unit configured to acquire detection information including at least one of information regarding a state of the user or information regarding a surrounding state, wherein
the second determination unit is further configured to perform the determination on a basis of the acquired detection information, and
the acquisition unit is implemented via at least one processor.

11. The information processing apparatus according to claim 1, further comprising
an acquisition unit configured to acquire detection information including at least one of information regarding a state of a user or information regarding a surrounding state, wherein
the reproduction control unit is further configured to control the reproduction of the audio content on a basis of the acquired detection information, and
the acquisition unit is implemented via at least one processor.

12. The information processing apparatus according to claim 11, wherein
the reproduction control unit is further configured to control the reproduction of the audio content on a basis of a surrounding environmental sound.

13. The information processing apparatus according to claim 11, wherein
the reproduction control unit is further configured to control the reproduction of the audio content on a basis of a number of operations of the user on the real object.

14. The information processing apparatus according to claim 1, wherein
the reproduction control unit is further configured to select one or more pieces of sensor information that are references for reproduction control of a plurality of pieces of sensor information generated on a basis of the motion of the real object and control time information regarding acquisition of the selected one or more pieces of sensor information on a basis of the reproduction of the audio content.

15. The information processing apparatus according to claim 1, wherein
the reproduction control unit is further configured to select earliest acquired sensor information of a plurality of pieces of sensor information as one or more pieces of sensor information that are references for the reproduction control.

16. The information processing apparatus according to claim 1, wherein
the reproduction control unit is further configured to start the reproduction of the audio content in response to the acquisition of the sensor information and determine whether or not to continue the reproduction of the audio content on a basis of whether or not information regarding continuation of the reproduction of the audio content has been acquired.

17. The information processing apparatus according to claim 1, wherein
the reproduction control unit is further configured to control the reproduction of the audio content on a basis of whether or not other audio content different from the audio content corresponding to the motion of the real object is reproduced.

18. An information processing method, comprising
by a computer system
calculating an amount of delay between a time at which a motion sensor generates sensor information on a basis of a motion of a real object and a time at which the sensor information is acquired by the information processing apparatus, and
selecting, on a basis of whether the amount of delay is within a predetermined time range, between controlling a speaker to reproduce audio content by a first reproduction method and controlling the speaker to reproduce the audio content by a second reproduction method.

19. A non-transitory computer-readable medium having embodied thereon a program, which when executed by a computer causes the computer to execute an information processing method, the method comprising
calculating an amount of delay between a time at which a motion sensor generates sensor information on a basis of a motion of a real object and a time at which the sensor information is acquired by the information processing apparatus, and
selecting, on a basis of whether the amount of delay is within a predetermined time range, between controlling a speaker to reproduce audio content by a first reproduction method and controlling the speaker to reproduce the audio content by a second reproduction method.

20. The information processing apparatus according to claim 1, wherein the reproduction control unit is further configured to
select, on a basis the amount of delay being within the predetermined time range, control of the speaker to reproduce the audio content by the first reproduction method, and
select, on a basis the amount of delay being out of the predetermined time range, control of the speaker to reproduce the audio content by the second reproduction method.

* * * * *